(12) United States Patent
Wang et al.

(10) Patent No.: US 11,962,526 B2
(45) Date of Patent: Apr. 16, 2024

(54) METHOD FOR OBTAINING QUANTITY OF RESOURCE ELEMENTS IN COMMUNICATION PROCESS AND RELATED APPARATUS

(71) Applicant: Huawei Technologies Co., Ltd., Shenzhen (CN)

(72) Inventors: Ting Wang, Shanghai (CN); Yongzhao Cao, Shanghai (CN); Yi Wang, Shanghai (CN); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 447 days.

(21) Appl. No.: 17/180,387

(22) Filed: Feb. 19, 2021

(65) Prior Publication Data
US 2021/0176024 A1    Jun. 10, 2021

Related U.S. Application Data

(63) Continuation of application No. 16/692,891, filed on Nov. 22, 2019, now Pat. No. 10,951,373, which is a
(Continued)

(51) Int. Cl.
*H04L 5/00*       (2006.01)
*H04L 1/00*       (2006.01)
(Continued)

(52) U.S. Cl.
CPC .......... *H04L 5/0048* (2013.01); *H04L 1/0026* (2013.01); *H04L 25/0224* (2013.01);
(Continued)

(58) Field of Classification Search
None
See application file for complete search history.

(56) References Cited

U.S. PATENT DOCUMENTS

| | | |
|---|---|---|
| 10,098,103 B2 | 10/2018 | Lim et al. |
| 2013/0308504 A1 | 11/2013 | Nimbalker et al. |
| 2015/0071238 A1 | 3/2015 | Seo et al. |
| 2018/0007672 A1 | 1/2018 | Chen et al. |

(Continued)

FOREIGN PATENT DOCUMENTS

| | | |
|---|---|---|
| CN | 102687438 A | 9/2012 |
| CN | 102957471 A | 3/2013 |

(Continued)

OTHER PUBLICATIONS

"3rd Generation Partnership Project; Technical Specification Group Radio Access Network; NR; User Equipment (UE) radio transmission and reception; Part 1: Range 1 Standalone (Release 15)," 3GPP TS 38.101-1 V15.0.0, Dec. 2017, 49 pages.

(Continued)

*Primary Examiner* — Suhail Khan
(74) *Attorney, Agent, or Firm* — Slater Matsil, LLP

(57) ABSTRACT

A method for obtaining a quantity of resource elements in a communication process, comprising: determines a downlink control information format of downlink control information, obtains, based on the downlink control information format, a quantity of resource elements occupied by a demodulation reference signal (DMRS); and determines a size of transport block (TBS) based on the quantity of resource elements occupied by the DMRS.

20 Claims, 4 Drawing Sheets

Related U.S. Application Data continuation of application No. PCT/CN2019/074997, filed on Feb. 13, 2019.

(51) Int. Cl.
  *H04L 25/02* (2006.01)
  *H04L 27/26* (2006.01)
  *H04W 72/23* (2023.01)

(52) U.S. Cl.
  CPC ......... *H04L 27/2613* (2013.01); *H04W 72/23* (2023.01); *H04L 27/26136* (2021.01)

(56) References Cited

U.S. PATENT DOCUMENTS

| | | | |
|---|---|---|---|
| 2018/0324760 | A1 | 11/2018 | Yuk et al. |
| 2019/0044642 | A1 | 2/2019 | Wikstrom et al. |
| 2019/0068308 | A1 | 2/2019 | Shin et al. |
| 2019/0074929 | A1 | 3/2019 | Aiba et al. |
| 2019/0159178 | A1 | 5/2019 | Tang |
| 2019/0223204 | A1* | 7/2019 | Kim ................... H04L 5/0053 |
| 2019/0260520 | A1 | 8/2019 | Dong et al. |
| 2020/0127786 | A1 | 4/2020 | Kwak et al. |

FOREIGN PATENT DOCUMENTS

| | | |
|---|---|---|
| CN | 104753575 A | 7/2015 |
| CN | 106856426 A | 6/2017 |
| CN | 107371272 A | 11/2017 |
| EP | 3389204 A1 | 10/2018 |
| EP | 3411972 B1 | 4/2020 |
| KR | 20160150610 A | 12/2016 |
| WO | 2017134238 A1 | 8/2017 |

OTHER PUBLICATIONS

"3rd Generation Partnership Project; Technical Specification Group Radio Access Network; NR; Multiplexing and channel coding (Release 15)," 3GPP TS 38.212 V15.0.0, Dec. 2017, 82 pages.

"3rd Generation Partnership Project; Technical Specification Group Radio Access Network; NR; Physical layer procedures for control (Release 15)," 3GPP TS 38.213 V15.0.0, Dec. 2017, 56 pages.

"3rd Generation Partnership Project;Technical Specification Group Radio Access Network; NR; Physical layer measurements (Release 15)," 3GPP TS 38.215 V15.0.0, Dec. 2017, 13 pages.

"3rd Generation Partnership Project; Technical Specification Group Radio Access Network; NR; NR and NG-RAN Overall Description; Stage 2 (Release 15)," 3GPP TS 38.300 V15.0.0, Dec. 2017, 68 pages.

"3rd Generation Partnership Project;Technical Specification Group Radio Access Network; NR; Medium Access Control (MAC) protocol specification (Release 15)," 3GPP TS 38.321 V15.0.0, Dec. 2017, 55 pages.

"3rd Generation Partnership Project; Technical Specification Group Radio Access Network NR Radio Resource Control (RRC) protocol specification (Release 15)," 3GPP TS 38.331 V15.0.0, Dec. 2017, 188 pages.

3GPP TS 38.212 V15.0.0 (Dec. 2017), 3rd Generation Partnership Project; Technical Specification Group Radio Access Network; NR; Multiplexing and channel coding(Release 15), 82 pages.

3rd Generation Partnership Project; Technical Specification Group Radio Access Network; NR; Physical channels and modulation (Release 15); 3GPP TS 38.211 V15.0.0 (Dec. 2017); 73 pages.

3rd Generation Partnership Project; Technical Specification Group Radio Access Network; NR;Physical layer procedures for data (Release 15); 3GPP TS 38.214 V15.0.0 (Dec. 2017); 71 pages.

Ericsson, "System level evaluation results for TTI shortening techniques", 3GPP TSG RAN WG1 Meeting #84, R1-160928, Feb. 15-19, 2016, 10 pages, Malta.

Huawei et al.,"TB mapping and TB size determination", 3GPP TSG RAN WG1 NR Ad Hoc Meeting, R1-1709978, Jun. 27-30, 2017, 8 pages, Qingdao, China.

Ericsson, "Summary of offline discussion on 7.3.3.1 (TB size, update of R1-1719035)", TSG-RAN WG1 #90bis, R1-1719144, Oct. 9 13, 1 page, Prague, Czech Republic.

Catt et al, "On contents of DCI formats", 3GPP TSG RAN WG1 Meeting AH 1801, R1-1800251, Jan. 22-26, 2018, 4 pages, Vancouver, Canada.

* cited by examiner

METHOD FOR OBTAINING QUANTITY OF RESOURCE ELEMENTS IN COMMUNICATION PROCESS AND RELATED APPARATUS

CROSS-REFERENCE TO RELATED APPLICATIONS

This application is a continuation of U.S. patent application Ser. No. 16/692,891, filed on Nov. 22, 2019, which is a continuation of International Application No. PCT/CN2019/074997, filed on Feb. 13, 2019. The International Application claims priority to Chinese Patent Application No. 201810150365.0, filed on Feb. 13, 2018. All of the aforementioned patent applications are hereby incorporated by reference in their entireties.

TECHNICAL FIELD

This application relates to the communications field, and more specifically, to a method for obtaining a quantity of resource elements in a communication process and a related apparatus.

BACKGROUND

When a base station performs data communication with user equipment (UE), the base station may schedule data for the UE. For example, the base station may allocate a time domain resource and a frequency domain resource to the UE via signaling. The time domain resource and the frequency domain resource may be collectively referred to as a time-frequency resource.

When scheduling data for the UE, in addition to allocating a time-frequency resource, the base station further needs to determine a size of a data block transmitted on the time-frequency resource. The size of the data block may also be referred to as a size of transport block (transmission block size, TBS). The TBS indicates a size of bit information carried on a time-frequency resource scheduled by the base station.

Usually, to determine a TBS, a quantity of REs occupied by a demodulation reference signal (DMRS) needs to be determined first. Therefore, how to determine the quantity of REs occupied by the DMRS is a technical problem to be resolved.

SUMMARY

This application provides a method for obtaining a quantity of resource elements in a communication process and a related apparatus, so that a quantity of REs occupied by a demodulation reference signal can be determined. This helps determine a TBS, and further helps ensure communication reliability.

According to a first aspect, this application provides a method for obtaining a quantity of resource elements in a communication process. The method includes: obtaining first information, where the first information includes at least one type of the following information: a downlink control information format, a configuration type of a demodulation reference signal, a quantity of symbols occupied by the demodulation reference signal, a waveform, a radio network temporary identifier scrambling manner of downlink control information, a data channel type, a quantity of symbols occupied by a data block, and a position of a symbol occupied by the data block; and obtaining, based on the first information, a quantity, corresponding to the first information, of resource elements occupied by the demodulation reference signal, where there is a correspondence between the first information and the quantity of resource elements occupied by the demodulation reference signal.

In the method, a communications apparatus may directly obtain the quantity of resource elements occupied by the demodulation reference signal, based on the correspondence between the first information and the quantity of resource elements occupied by the demodulation reference signal. This helps determine a TBS, and further helps ensure communication reliability.

In a possible implementation, the first information is in a one-to-one correspondence with the quantity of resource elements occupied by the demodulation reference signal.

In this implementation, the communications apparatus can obtain, based on the correspondence by obtaining only the first information, the quantity of resource elements occupied by the demodulation reference signal.

In a possible implementation, when the first information includes the downlink control information format, the obtaining, based on the first information, a quantity of resource elements occupied by the demodulation reference signal includes: if the downlink control information format is downlink control information format 1_0, obtaining that the quantity of resource elements occupied by the demodulation reference signal is 4 or 6; and/or if the downlink control information format is downlink control information format 0_0, obtaining that the quantity of resource elements occupied by the demodulation reference signal is 6 or 4.

In a possible implementation, when the first information includes the configuration type of the demodulation reference signal, the obtaining, based on the first information, a quantity of resource elements occupied by the demodulation reference signal includes: if the configuration type of the demodulation reference signal is configuration type 1, obtaining that the quantity of resource elements occupied by the demodulation reference signal is 6; and/or if the configuration type of the demodulation reference signal is configuration type 2, obtaining that the quantity of resource elements occupied by the demodulation reference signal is 4.

In a possible implementation, when the first information includes the configuration type of the demodulation reference signal and the quantity of symbols occupied by the demodulation reference signal, the obtaining, based on the first information, a quantity of resource elements occupied by the demodulation reference signal includes: if the configuration type of the demodulation reference signal is configuration type 1, and the quantity of symbols occupied by the demodulation reference signal is 1, obtaining that the quantity of resource elements occupied by the demodulation reference signal is 6; and/or if the configuration type of the demodulation reference signal is configuration type 1, and the quantity of symbols occupied by the demodulation reference signal is 2, obtaining that the quantity of resource elements occupied by the demodulation reference signal is 12; and/or if the configuration type of the demodulation reference signal is configuration type 2, and the quantity of symbols occupied by the demodulation reference signal is 1, obtaining that the quantity of resource elements occupied by the demodulation reference signal is 4; and/or if the configuration type of the demodulation reference signal is configuration type 2, and the quantity of symbols occupied by the demodulation reference signal is 2, obtaining that the quantity of resource elements occupied by the demodulation reference signal is 8.

In a possible implementation, the obtaining, based on the first information, a quantity of resource elements occupied by the demodulation reference signal includes: obtaining the quantity of resource elements occupied by the demodulation reference signal, based on the correspondence between the first information and the quantity of resource elements occupied by the demodulation reference signal.

In a possible implementation, the method is performed by a terminal device, and the correspondence in the method is configured by the terminal device according to a communication protocol or received by the terminal device from an access network device.

According to a second aspect, this application provides a communications apparatus. The communications apparatus includes a module configured to perform the method in any one of the first aspect or the possible implementations of the first aspect. The module included in the communications apparatus may be implemented by using software and/or hardware.

According to a third aspect, this application provides a communications device. The communications device includes at least one processor and a communications interface. The communications interface is used by the communications device to exchange information with another communications device, and when a one or more instructions is executed by the at least one processor, the method in any one of the first aspect or the possible implementations of the first aspect is performed.

Optionally, the communications device may further include a memory. The memory is configured to store a program and data.

Optionally, the communications device may be an access network device, for example, a base station, or may be a terminal device.

According to a fourth aspect, this application provides a computer readable storage medium. The computer readable storage medium stores program code executed by a communications device. The program code includes an instruction used to perform the method in any one of the first aspect or the possible implementations of the first aspect.

For example, the computer readable storage medium may store program code executed by an access network device (for example, a base station) or a terminal device, and the program code includes an instruction used to perform the method in any one of the first aspect or the possible implementations of the first aspect.

According to a fifth aspect, this application provides a computer program product including an instruction. When the computer program product runs on a communications device, the communications device executes an instruction for the method in any one of the first aspect or the possible implementations of the first aspect.

For example, when the computer program product runs on an access network device (for example, a base station) or a terminal device, the access network device or the terminal device executes the instruction for the method in any one of the first aspect or the possible implementations of the first aspect.

According to a sixth aspect, this application provides a system chip. The system chip includes an input/output interface and at least one processor, and the at least one processor is configured to invoke an instruction in a memory to perform an operation of the method in any one of the first aspect or the possible implementations of the first aspect.

Optionally, the system chip may further include at least one memory and a bus, and the at least one memory is configured to store the instruction executed by the processor.

According to a seventh aspect, this application provides a communications system.

The communications system includes the communications device in the third aspect.

DETAILED DESCRIPTION OF ILLUSTRATIVE EMBODIMENTS

With reference to the accompanying drawings, the following describes the technical solutions in this application by using an example in which communications apparatuses are a terminal device and a base station.

Figure 1:
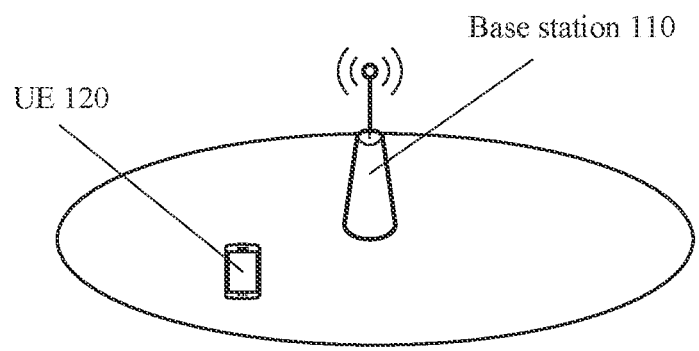
FIG. 1 is a schematic structural diagram of a communications system to which a communication method according to an embodiment of this application may be applied.

FIG. 1 is a schematic structural diagram of a communications system to which a communication method according to an embodiment of this application may be applied. It should be understood that this embodiment of this application is not limited to a system architecture shown in FIG. 1. In addition, an apparatus in FIG. 1 may be hardware, functionally divided software, or a combination thereof.

It may be obtained from FIG. 1 that the communications system to which the communication method in this embodiment of this application may be applied may include a base station no and UE 120.

It should be understood that a specific type of the base station no is not limited in this embodiment of this application. In systems using different radio access technologies, devices having a base station function may have different names. For ease of description, in all the embodiments of this application, the foregoing apparatuses that provide a wireless communication function for a terminal are collectively referred to as a base station, for example, a base station device in a further network or a picocell base station device (pico).

The base station 110 includes but is not limited to: an evolved NodeB (eNB), a radio network controller (RNC), a NodeB (Node B, NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (transmission and reception point, TRP; or TP), or the like; or may be a gNB or a transmission point (TRP or TP) in a 5G system such as an NR system, one antenna panel or one group of antenna panels (including a plurality of antenna panels) of a base station in a 5G system; or may be a network node forming a gNB or a transmission point, such as a baseband unit (BBU) or a distributed unit (DU).

The UE 120 may communicate with one or more core networks via a radio access network (RAN). The UE may also be referred to as an access terminal, a terminal device, a subscriber unit, a subscriber station, a mobile station, a mobile console, a remote station, a remote terminal, a mobile device, a user terminal, a wireless communications device, a user agent, or a user apparatus. The UE may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, an in-vehicle device, a wearable device, a terminal device in the Internet of things or internet of vehicles, a terminal device in any form in a future network, or the like.

When the base station 110 performs data communication with the UE 120, the base station 110 may schedule data for the UE 120. For example, the base station 110 may allocate a time domain resource and a frequency domain resource to the UE 120 via signaling. The time domain resource and the frequency domain resource may be collectively referred to as a time-frequency resource.

When scheduling data for the UE 120, in addition to allocating a time-frequency resource, the base station no needs to determine a TBS on the time-frequency resource.

The TBS may be calculated based on a quantity of resource elements (RE), used to transmit a data block, on a time-frequency resource scheduled by the base station.

For example, when performing scheduling for the UE in a form of slots, the base station may calculate a TBS based on a quantity of REs, used to transmit a data block, in one resource block (RB) in one slot. For another example, the quantity of REs may be multiplied by a modulation scheme, and then an obtained result is multiplied by a bit rate and a quantity of layers to obtain the TBS.

A quantity of REs, used to transmit a data block, in one RB in one slot may be calculated by using a total quantity of REs that are allocated from one RB in the slot to transmit data, a quantity of REs, occupied by a demodulation reference signal, in these REs, and a quantity of other REs, unable to be used to transmit a data channel, in these REs. Data cannot be mapped to the REs unable to be used to transmit a data channel. For example, an RE occupied by a channel state information-reference signal (CSI-RS) cannot be used to transmit a data channel.

In other words, to determine a TBS, a quantity of REs used to transmit a data block needs to be determined first; and to determine the quantity of REs used to transmit a data block, a quantity of REs occupied by a demodulation reference signal needs to be determined first.

The demodulation reference signal in this application may include a data demodulation reference signal and/or a phase tracking reference signal (PTRS). The data demodulation reference signal (DMRS) may be a reference signal used for data demodulation, or may be a reference signal used for data channel estimation. The PTRS may be a reference signal used for phase tracking and/or phase estimation.

When downlink data block transmission is performed between the base station 110 and the UE 120, on a base station side, the base station 110 may send, to the UE 120, a demodulation reference signal and downlink control information (DCI) used to schedule downlink data transmission, determine a quantity of REs, occupied by the demodulation reference signal, in a resource scheduled by the DCI, calculate a TBS based on the quantity, and send the data block to the UE 120 based on the TBS; and on a terminal side, the UE 120 may receive the DCI and the demodulation reference signal, determine a quantity of REs, occupied by the demodulation reference signal, in a resource scheduled by the DCI, calculate a TBS based on the quantity, and receive, based on the TBS, the data block sent by the base station 11o.

When an uplink data block is transmitted between the base station 110 and the UE 120, on a base station side, the base station 110 may send, to the UE, DCI used to schedule uplink data transmission; on a terminal side, the UE 120 may send a demodulation reference signal to the base station 11o, determine a quantity of REs, occupied by the demodulation reference signal, in a resource scheduled by the DCI, calculate a TBS based on the quantity, and send the uplink data block to the base station 110 based on the TBS; on the base station side, the base station no receives the demodulation reference signal, determines a quantity of REs, occupied by the demodulation reference signal, in a resource scheduled by the DCI, calculates a TBS based on the quantity, and receives, based on the TBS, the uplink data block sent by the UE 120.

It should be understood that, in this embodiment of this application, the quantity of REs occupied by the demodulation reference signal may be a quantity of possible REs, used to transmit the demodulation reference signal, in the resource scheduled by the DCI. In other words, in this embodiment of this application, the quantity of REs occupied by the demodulation reference signal may be greater than or equal to a quantity of REs, actually used to transmit the demodulation reference signal, in the resource scheduled by the DCI.

For example, the resource scheduled by the DCI may include 12 REs that may be used to transmit the demodulation reference signal, where only 8 REs in the resource may be actually used to transmit the demodulation reference signal. In this embodiment of this application, the quantity of REs occupied by the demodulation reference signal may be 12.

The DCI is information used for data scheduling or signal transmission, and may be referred to as control information for short. Data scheduling includes uplink data scheduling and/or downlink data scheduling. Signal transmission includes signal sending and/or receiving. The DCI may be transmitted via higher layer signaling, or may be transmitted via physical layer signaling. This is not limited in this application.

The higher layer signaling may be radio resource control (RRC) signaling, medium access control (MAC) signaling, or other higher layer signaling.

The technical solutions proposed in this application mainly include methods used by the base station 110 and the user equipment 120 to determine the quantity of REs, occupied by the demodulation reference signal, in the resource scheduled by the DCI.

In the method in this embodiment of this application, a correspondence may be predefined between the quantity of REs occupied by the demodulation reference signal and at least one type of the following information: a DCI format, a configuration type of the demodulation reference signal, a quantity of symbols occupied by the demodulation reference signal, a position of a symbol occupied by the demodulation reference signal, a waveform, a radio network temporary identifier (RNTI) scrambling manner of DCI, a data channel type, a quantity of symbols occupied by a data block, and a position of a symbol occupied by the data block, and then the correspondence is configured on the base station no and the UE 120. In this way, after obtaining the at least one type of information, the base station no and the UE 120 may obtain, based on the at least one type of information and the correspondence, the quantity of REs occupied by the demodulation reference signal.

Optionally, the waveform may be a channel waveform, or may be a signal waveform. For example, the channel waveform may be a waveform of a physical uplink data channel, a waveform of a physical uplink control channel, a waveform of a physical downlink data channel, or a waveform of a physical downlink control channel. For example, the signal waveform may be a waveform of a reference signal, such as a waveform of a demodulation reference signal.

Optionally, the waveform may be a single-carrier waveform or a multi-carrier waveform. Optionally, the waveform may be used to indicate whether transform precoding is enabled or the like. Optionally, the waveform may include a cyclic prefix (CP)-orthogonal frequency division multiplexing (OFDM) waveform and/or a discrete Fourier transform-spread-orthogonal frequency division multiplexing (discrete Fourier transform-spread-OFDM, DFT-s-OFDM) waveform.

A relationship between a data block, a demodulation reference signal, and DCI is as follows: The DCI is DCI used to schedule the data block, and the demodulation reference signal is a demodulation reference signal used to transmit the data block or a demodulation reference signal sent on a time-frequency resource scheduled by the DCI.

In this embodiment of this application, the base station 110 does not send, to the UE 120, information about a code division multiplexing group (code division multiplexing (ed/ing) group, CDM group) in which an antenna port corresponding to the DMRS is located, and the UE 120 may also determine, based on the at least one type of information and the correspondence between the at least one type of information and the quantity of REs occupied by the demodulation reference signal, the quantity of REs occupied by the demodulation reference signal.

Optionally, the correspondence configured on the UE 120 may be configured by the UE 120, for example, predefined according to a protocol, or may be configured by the UE 120 after the UE 120 receives the correspondence from the base station no, for example, determined via signaling received from the base station.

For ease of subsequent description, the at least one type of information is referred to as first information. In other words, the first information may include at least one type of the following information: the DCI format, the configuration type of the demodulation reference signal, the quantity of symbols occupied by the demodulation reference signal, the waveform, the RNTI scrambling manner of the DCI, the quantity of symbols occupied by the data block, and the position of the symbol occupied by the data block.

For ease of subsequent description, quantity of REs occupied by a demodulation reference signal is referred to as a demodulation reference signal RE overhead, or may be briefly referred to as a demodulation reference signal overhead.

For example, if the quantity of REs occupied by the demodulation reference signal is 8, it indicates that the demodulation reference signal occupies 8 REs; and/or if the demodulation reference signal RE overhead value is 8, it indicates that the demodulation reference signal occupies 8 REs; and/or if the demodulation reference signal overhead is 8, it indicates that overheads of the demodulation reference signal are 8 REs.

Optionally, in this embodiment of this application, a correspondence between first information and a demodulation reference signal RE overhead is predefined. An optional manner includes: configuring, for first information, a fixed demodulation reference signal RE overhead value; or setting a demodulation reference signal RE overhead value configured for the first information to a fixed value.

For example, for a DCI format, a demodulation reference signal RE overhead value may be set to a fixed value 4. Specifically, the following may be predefined: When the DCI format is DCI format 1_0, the DMRS RE overhead value is 4. This may indicate that the demodulation reference signal RE overhead value is fixed to 4 for DCI format 1_0.

For example, the following is predefined: When the DCI format is DCI format 0_0, the DMRS RE overhead value is 6. This may indicate that the demodulation reference signal RE overhead value is fixed to 6 for DCI format 0_0.

Optionally, in this embodiment of this application, for receiving remaining minimum system information (RMSI), when the UE receives no radio resource control (RRC) configuration information, the UE may determine the demodulation reference signal RE overhead based on a quantity of REs actually used to transmit the DMRS. For example, the demodulation reference signal RE overhead value may be set to a fixed value 4.

Optionally, in this embodiment of this application, for unicast data scheduled when the DCI format is DCI format 1_0 or DCI format 0_0, data scheduled in this manner usually can be transmitted on only one antenna port at one layer. Therefore, if an RRC parameter is configured for the UE, for example, the RRC parameter may be a downlink DMRS configuration type (for example, DL-DMRS-config-type), a downlink DMRS maximum length (for example, DL-DMRS-max-len), an uplink DMRS configuration type (for example, UL-DMRS-config-type), and/or an uplink DMRS maximum length (for example, UL-DMRS-max-len), the UE may determine the demodulation reference signal RE overhead value based on at least one of the foregoing configured RRC parameters. Optionally, in consideration of a simpler and more uniform system design and implementation, a same DMRS RE overhead may be used for data transmission scheduled in a same DCI format. For example, the same DCI format may be DCI format 0_0 or DCI format 1_0. In a possible manner, for data transmission scheduled in DCI format 0_0 or DCI format 1_0, an RE overhead value of a demodulation reference signal on each physical resource block (PRB) is set to a fixed value, for example, 4 or 6.

In the method in this embodiment of this application, optionally, first information may be in a one-to-one correspondence with demodulation reference signal RE overhead. In this way, the base station no and the UE 120 can obtain a demodulation reference signal RE overhead value based on a correspondence between first information and a demodulation reference signal RE overhead value only by obtaining the first information.

The following describes how to predefine the correspondence between first information and a demodulation reference signal RE overhead value, in other words, how to predefine a specific quantity of REs occupied by the demodulation reference signal corresponding to a type of first information. The correspondence between first information and a demodulation reference signal RE overhead value may include at least one of the following manners:

In a possible design manner, the first information includes the DCI format. In other words, the base station and/or the UE may obtain, based on the DCI format, a quantity, corresponding to the DCI format, of REs occupied by the demodulation reference signal. There is a correspondence between the DCI format and the quantity of REs occupied by the demodulation reference signal.

Optionally, correspondences between one or more DCI formats and DMRS RE overhead values may be predefined. The correspondence between a DCI and a DMRS RE overhead value may be pre-configured on the base station, and the correspondence may also be pre-configured on the UE, or the correspondence may be configured based on signaling after the signaling is received from the base station.

Optionally, the downlink control information format may be used to distinguish between different functions of downlink control information, or may be used to distinguish between content and/or quantities of bits of downlink control information.

Optionally, different functions of downlink control information may indicate control information used to schedule uplink data or control information used to schedule downlink data, control information in a fallback mode or control information in a normal mode, shortened control information or normal control information, control information used for single-codeword scheduling or control information used for multi-codeword scheduling, and/or control information used for open-loop data scheduling or control information used for closed-loop data scheduling, and/or the like.

For example, format 1_0 may be a format 0f the control information used to schedule downlink data, and format 0_0 may be a format 0f the control information used to schedule uplink data.

For example, format 1_0 is a format 0f control information used to schedule downlink data in the fallback mode, a format 0f control information used to schedule downlink data in a shortened mode, and/or a format 0f control information that is used to schedule downlink data and that occupies a relatively small quantity of bits; and format 1_1 is a format 0f control information used to schedule downlink data in the normal mode and/or a format 0f control information that is used to schedule downlink data and that occupies a relatively large quantity of bits.

For example, format 0_0 is a format 0f control information used to schedule uplink data in the fallback mode, a format 0f control information used to schedule uplink data in a shortened mode, and/or a format 0f control information that is used to schedule uplink data and that occupies a relatively small quantity of bits; and format 0_1 is a format 0f control information used to schedule uplink data in the normal mode and/or a format 0f control information that is used to schedule uplink data and that occupies a relatively large quantity of bits.

For example, the following may be predefined: When the DCI format is a fallback (fallback) DCI format, the DMRS RE overhead value is X, where X is an integer.

For example, the following may be predefined: When the DCI format is DCI format 0_0 or DCI format 1_0, the DMRS RE overhead is X. Optionally, a value of X may be any one of 4, 6, 8, 12, 16, 24, or the like.

Optionally, a DMRS RE overhead predefined for a format 0f DCI used to schedule uplink data transmission may be the same as a DMRS RE overhead predefined for a format 0f DCI used to schedule downlink data transmission.

For example, the following may be predefined: When the DCI format is DCI format 1_0, the DMRS RE overhead value is 4; or when the DCI format is DCI format 0_0, the DMRS RE overhead value is 4.

For example, the following may be predefined: When the DCI format is DCI format 1_0, the DMRS RE overhead value is 6; or when the DCI format is DCI format 0_0, the DMRS RE overhead value is 6.

Optionally, a DMRS RE overhead predefined for a format 0f DCI used to schedule uplink data transmission may be different from a DMRS RE overhead predefined for a format 0f DCI used to schedule downlink data transmission. For example, the following may be predefined: When the DCI format is the format 0f the DCI used to schedule downlink data transmission, the DMRS RE overhead value is X1; or when the DCI format is the format 0f the DCI used to schedule uplink data transmission, the DMRS RE overhead value is X2, where both X1 and X2 are integers. A value of X1 and/or X2 may be any one of 4, 6, 8, 12, 16, 24, and the like.

For example, the following may be predefined: When the DCI format is DCI format 1_0, the DMRS RE overhead value is 4; or when the DCI format is DCI format 0_0, the DMRS RE overhead value is 6. Optionally, a plurality of DMRS RE overheads may be alternatively predefined for a same DCI format. In this case, the base station 110 may inform, via signaling, the UE 120 of which of the plurality of values should be used to calculate a TBS.

For example, the DMRS RE overhead values predefined for a same DCI format include 4, 6, 8, 12, or the like. The base station 110 informs, via higher layer signaling or physical layer signaling, the UE 120 that the DMRS RE overhead value 6 is used to calculate a TBS.

Optionally, a plurality of correspondences between one downlink control information format and DMRS RE overhead may be predefined. The base station may inform, via signaling, the UE which correspondence should be used to calculate a TBS.

For example, a correspondence between format 0_0 and a DMRS RE overhead value may include at least one of the following correspondences:

a correspondence x1: format 0_0 corresponds to the DMRS RE overhead value 4;

a correspondence x2: format 0_0 corresponds to the DMRS RE overhead value 6;

a correspondence x3: format 0_0 corresponds to the DMRS RE overhead value 8; and a correspondence x4: format 0_0 corresponds to the DMRS RE overhead value 12.

The base station may inform the UE via higher layer signaling and/or physical layer signaling of which one of the plurality of correspondences between the format 0_0 and DMRS RE overhead values may be used to determine a DMRS RE overhead value.

For example, "00" represents the correspondence x1, "01" represents the correspondence x2, "10" represents the correspondence x3, and "n" represents the correspondence x4.

For example, a correspondence between format 1_0 and a DMRS RE overhead value may include at least one of the following correspondences:

a correspondence x1': format 1_0 corresponds to the DMRS RE overhead value 4;

a correspondence x2': format 1_0 corresponds to the DMRS RE overhead value 6;

a correspondence x3': format 1_0 corresponds to the DMRS RE overhead value 8; and a correspondence x4': format 1_0 corresponds to the DMRS RE overhead value 8.

The base station may inform the UE via higher layer signaling and/or physical layer signaling, and one of the plurality of correspondences between the format 1_0 and DMRS RE overhead values may be used to determine a DMRS RE overhead value.

For example, "00" represents the correspondence x1', "01" represents the correspondence x2', "10" represents the correspondence x3', and "11" represents the correspondence x4'.

In a possible design manner, the first information includes the configuration type of the demodulation reference signal. To be specific, the base station and the UE may obtain, based on the configuration type of the demodulation reference signal, a quantity, corresponding to the configuration type of the demodulation reference signal, of resource elements occupied by the demodulation reference signal. There is a correspondence between the configuration type of the demodulation reference signal and the quantity of resource elements occupied by the demodulation reference signal.

Optionally, the configuration type of the demodulation reference signal is used to indicate a pattern type of the demodulation reference signal and/or a type of the demodulation reference signal.

Optionally, the pattern type may be a single-carrier pattern or a multi-carrier pattern, or may be a comb-like pattern or an RE pattern. For example, a type 1 corresponds to the comb-like pattern or the single-carrier pattern, and a type 2 corresponds to the multi-carrier pattern.

Optionally, the type of the demodulation reference signal may be a single-carrier demodulation reference signal or a multi-carrier demodulation reference signal. For example, a type 1 corresponds to the single-carrier demodulation reference signal, and a type 2 corresponds to the multi-carrier demodulation reference signal.

For example, one or more correspondence between a DMRS configuration type and a DMRS RE overhead may be predefined.

For example, the base station 110 may notify the UE 120 of a DMRS configuration type by using a parameter "DMRS-config-type" in higher layer signaling.

DL-DMRS-config-type or UL-DMRS-config-type may be used to indicate DMRS types, including a DMRS configuration type 1 and a DMRS configuration type 2, in other words, may be actually used to indicate information about a DMRS pattern.

Figure 2:
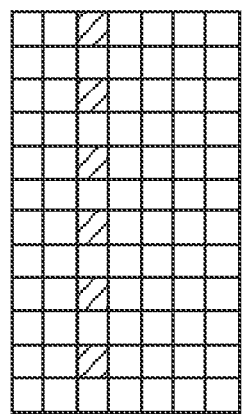
FIG. 2 is a schematic diagram of a DMRS pattern according to an embodiment of this application.
Figure 3:
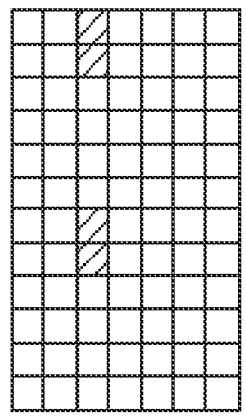
FIG. 3 is a schematic diagram of a DMRS pattern according to another embodiment of this application.

Optionally, a pattern corresponding to DMRS configuration type 1 is shown in FIG. 2, and a pattern corresponding to DMRS configuration type 2 may be shown in FIG. 3. In FIG. 2 and FIG. 3, a grid with slashes represents an RE occupied by a DMRS.

In FIG. 2, one RB includes 12 subcarriers and seven symbols, and a DMRS occupies the first, the third, the fifth, the seventh, the ninth, and the eleventh REs in the third symbol.

In FIG. 3, one RB includes 12 subcarriers and seven symbols, and a DMRS occupies the first, the second, the seventh, and the eighth REs in the third symbol.

Optionally, DMRS configuration types may be classified into an uplink DMRS configuration type and a downlink DMRS configuration type. The uplink DMRS configuration type and the downlink DMRS configuration type may be respectively indicated by using the parameter "UL-DMRS-config-type" and the parameter "DL-DMRS-config-type", or may be indicated by using a same parameter, or the configuration type of the DMRS may be determined in a predefined manner or another manner. This is not limited in this application.

An example in which the uplink DMRS configuration type is indicated by using the parameter "UL-DMRS-config-type", and the downlink DMRS configuration type is indicated by using the parameter "DL-DMRS-config-type" is used below for description.

For example, the following may be predefined: When UL-DMRS-config-type=1 or DL-DMRS-config-type=1, a DMRS RE overhead value is Y1; or when UL-DMRS-config-type=2 or DL-DMRS-config-type=2, a DMRS RE overhead value is Y2, where Y1 and Y2 are integers.

Optionally, Y1 and/or Y2 may be any value of 4, 6, 8, 12, 16, 24, and the like.

Optionally, the DMRS transmitted by the base station 110 and/or the UE 120 may be transmitted only on a single antenna port. In this case, for DMRS configuration type 1, one antenna port may correspond to six REs, and for DMRS configuration type 2, one antenna poll may correspond to four REs. Therefore, the following may be predefined: When UL-DMRS-config-type=1 or DL-DMRS-config-type=1, the DMRS RE overhead value is 6; or when UL-DMRS-config-type=2 or DL-DMRS-config-type=2, the DMRS RE overhead value is 4.

If the configuration parameter UL-DMRS-config-type is 1 or the configuration parameter DL-DMRS-config-type is 1, the DMRS configuration type is DMRS configuration type 1; or if the configuration parameter UL-DMRS-config-type is 2 or the configuration parameter DL-DMRS-config-type is 2, the DMRS configuration type is DMRS configuration type 2.

The antenna port is a logical antenna, and one antenna port may correspond to data transmission at one layer.

Optionally, one antenna port may correspond to one or more physical antennas.

Optionally, an antenna port is defined as follows. A channel over which a symbol on the antenna port is conveyed may be inferred by using a channel over which another symbol on the antenna port is conveyed. For example, channels over which different symbols on a same antenna port are conveyed may be the same, may have a linear relationship, or may be obtained by using a difference algorithm. A specific inference manner is not limited in this application.

That one antenna port corresponds to six REs may be as follows. A demodulation reference signal of one antenna port occupies six REs, or a demodulation reference signal of one antenna port is transmitted on six REs.

Optionally, Y1 and/or Y2 may have a plurality of values. When Y1 and/or Y2 have/has a plurality of values, the base station 110 may inform, via signaling, the UE 120 which one of the plurality of values is the DMRS RE overhead.

For example, the following is predefined: Y1 may be at least one of 6, 12, 18, 24, and the like. In this case, the base station 110 may inform, via signaling, the UE 120 which one of 6, 12, 18, and 24 is specifically the DMRS RE overhead value.

For example, the following is predefined: Y2 may be at least one of 4, 8, 12, 16, 20, 24, or the like. In this case, the base station 110 may inform, via signaling, the UE 120 which one of 4, 8, 12, 16, 20, or 24 is specifically the DMRS RE overhead value.

Optionally, a plurality of correspondences between one DMRS configuration type and DMRS RE overhead may be predefined. The base station may inform, via signaling, the UE which correspondence should be used to calculate a TBS.

For example, a correspondence between DMRS configuration type 1 and a DMRS RE overhead value may include at least one of the following correspondences:

a correspondence y1: DMRS configuration type 1 corresponds to the DMRS RE overhead value 6;

a correspondence y2: DMRS configuration type 1 corresponds to the DMRS RE overhead value 12;

a correspondence Y3: DMRS configuration type 1 corresponds to the DMRS RE overhead value 18; and a correspondence Y4: DMRS configuration type 1 corresponds to the DMRS RE overhead value 24.

The base station may inform, via higher layer signaling and/or physical layer signaling, the UE which one of the plurality of correspondences between DMRS configuration type 1 and the DMRS RE overhead values may be used to determine a DMRS RE overhead value.

For example, "00" represents the correspondence y1, "01" represents the correspondence y2, "10" represents the correspondence Y3, and "11" represents the correspondence Y4.

For example, a correspondence between DMRS configuration type 2 and a DMRS RE overhead value may include at least one of the following correspondences:

a correspondence y1': DMRS configuration type 2 corresponds to the DMRS RE overhead value 4;

a correspondence y2': DMRS configuration type 2 corresponds to the DMRS RE overhead value 8;

a correspondence Y3': DMRS configuration type 2 corresponds to the DMRS RE overhead value 12; and a correspondence Y4': DMRS configuration type 2 corresponds to the DMRS RE overhead value 16.

The base station may inform, via higher layer signaling and/or physical layer signaling, the UE which one of the plurality of correspondences between DMRS configuration type 2 and the DMRS RE overhead values may be used to determine a DMRS RE overhead value.

For example, "00" represents the correspondence y1', "01" represents the correspondence y2', "10" represents the correspondence Y3', and "11" represents the correspondence Y4'.

Optionally, DMRSs of different UEs may be code-division-based (namely, orthogonal sequences), or may be time-frequency-division-based (in other words, positions of REs occupied by DMRSs of different UEs are different). When DMRSs of different UEs are time-frequency-division-based, to reduce interference between the DMRSs of the UEs, data signals are mapped to none of the REs occupied by the DMRSs of the UEs. In other words, all the REs occupied by the DMRSs of the UEs need to be bypassed when data mapping is performed. In this case, a predefined DMRS RE overhead value should be the sum of RE DMRS overhead values of all the UEs.

For example, the base station 110 sends a DMRS to UE 1 on an antenna port 1000, sends a DMRS to UE 2 on an antenna port 1001, sends a DMRS to UE 3 on an antenna port 1002, and sends a DMRS to UE 4 on an antenna port 1003. The DMRSs of the UE 1 and the UE 2 are code-division-based, and the DMRSs of the UE 3 and the UE 4 are code-division-based. The DMRSs of the UE 1 and the UE 3 are time-frequency-division-based, and the DMRSs of the UE 2 and the UE 4 are time-frequency-division-based. To avoid mutual interference between the DMRSs of the UEs, total DMRS RE overheads of the antenna ports 1000, 1001, 1002, and 1003 need to be bypassed when resource mapping is performed on data of the UEs.

For example, the following may be predefined: When UL-DMRS-config-type=1 or DL-DMRS-config-type=1, the DMRS RE overhead value is 12 (because one antenna port may correspond to six REs for DMRS configuration type 1); or when UL-DMRS-config-type=2 or DL-DMRS-config-type=2, the DMRS RE overhead value is 8 (because one antenna port may correspond to four REs for DMRS configuration type 2).

In a possible design manner, the first information includes the configuration type of the demodulation reference signal and the quantity of symbols occupied by the demodulation reference signal. To be specific, a quantity that is of resource elements occupied by the demodulation reference signal and that corresponds to the configuration type of the demodulation reference signal and the quantity of symbols occupied by the demodulation reference signal may be obtained based on the configuration type of the demodulation reference signal and the quantity of symbols occupied by the demodulation reference signal. There is a correspondence of the quantity of resource elements occupied by the demodulation reference signal with the configuration type of the demodulation reference signal and the quantity of symbols occupied by the demodulation reference signal.

Optionally, the quantity of symbols occupied by the demodulation reference signal may be a number of symbols occupied by the DMRS, a quantity of symbols of a resource on which the DMRS is located, or a number of symbols of a resource on which the DMRS is located. For example, the DMRS may occupy one symbol, or occupy two symbols.

Optionally, the first information may include the DMRS configuration type and the quantity of symbols occupied by the DMRS. For example, a correspondence between a DMRS RE overhead value with parameters DMRS-config-type and DMRS-max-len may be predefined.

DL-DMRS-max-len or UL-DMRS-max-len may be used to indicate a maximum number of OFDM symbols occupied by the DMRS, for example, 1 or 2. Optionally, DL-DMRS-max-len or UL-DMRS-max-len may be used to indicate only a number of symbols occupied by a front load DMRS or a basic DMRS.

For example, the following may be predefined: When UL-DMRS-config-type=1 and UL-DMRS-max-len=1, or DL-DMRS-config-type=1 and DL-DMRS-max-len=1, the DMRS RE overhead value is Z1, where Z1 is an integer.

For example, the following may be predefined: When UL-DMRS-config-type=1 and UL-DMRS-max-len=2, or DL-DMRS-config-type=1 and DL-DMRS-max-len=2, the DMRS RE overhead value is Z2, where Z2 is an integer.

For example, the following may be predefined: When UL-DMRS-config-type=2 and UL-DMRS-max-len=1, or DL-DMRS-config-type=2 and DL-DMRS-max-len=1, the DMRS RE overhead value is Z3, where Z3 is an integer.

For example, the following may be predefined: When UL-DMRS-config-type=2 and UL-DMRS-max-len=2, or DL-DMRS-config-type=2 and DL-DMRS-max-len=2, the DMRS RE overhead value is Z4, where Z4 is an integer.

Optionally, values of Z1, Z2, Z3, and Z4 may be the same or different. This is not specifically limited. A value of any one of Z1, Z2, Z3, and Z4 may be 4, 6, 8, 12, 16, 18, 24, or the like.

Optionally, UL-DMRS-config-type, DL-DMRS-config-type, UL-DMRS-max-len, and/or DL-DMRS-max-len may be notified by the base station 110 to the UE 120 via higher layer signaling, or may be preconfigured on the UE 120. This is not limited herein.

Optionally, for the fallback mode, or for DCI format 0_0 and/or DCI format 1_0, an uplink DMRS and/or a downlink DMRS may be transmitted only on a single antenna port. In this case, if the configuration type of the DMRS is DMRS configuration type 1 and the quantity of symbols occupied by the DMRS is 1, one antenna port may correspond to six REs, and the following may be predefined: When UL-DMRS-config-type=1 and UL-DMRS-max-len=1, or when DL-DMRS-config-type=1 and DL-DMRS-max-len=1, the DMRS RE overhead value is 6.

If the configuration type of the DMRS is DMRS configuration type 1 and the quantity of symbols occupied by the DMRS is 2, one antenna port may correspond to 12 REs, and the following may be predefined: When UL-DMRS-config-type=1 and UL-DMRS-max-len=2, or when DL-DMRS-config-type=1 and DL-DMRS-max-len=2, the DMRS RE overhead value is 12.

If the configuration type of the DMRS is DMRS configuration type 2 and the quantity of symbols occupied by the DMRS is 1, one antenna port may correspond to four REs, and the following may be predefined: When UL-DMRS-config-type=2 and UL-DMRS-max-len=1, or when DL-DMRS-config-type=2 and DL-DMRS-max-len=1, the DMRS RE overhead value is 4.

If the configuration type of the DMRS is DMRS configuration type 2 and the quantity of symbols occupied by the DMRS is 2, one antenna port may correspond to eight REs, and the following may be predefined: When UL-DMRS-config-type=2 and UL-DMRS-max-len=2, or when DL-DMRS-config-type=2 and DL-DMRS-max-len=2, the DMRS RE overhead value is 8.

Optionally, DMRSs of different UEs may be code-division-based (namely, orthogonal sequences), or may be time-frequency-division-based (in other words, positions of REs occupied by DMRSs of different UEs are different). When time-frequency division is performed on DMRSs of different UEs, to reduce mutual interference between the DMRSs of the UEs, data signals are mapped to none of the REs occupied by the DMRSs of the UEs. In other words, all the REs occupied by the DMRSs of the UEs need to be bypassed when data mapping is performed. In this case, a predefined DMRS RE overhead value should be the sum of DMRS RE overhead values of all the UEs.

For example, the base station 110 sends a DMRS to UE 1 on an antenna port 1000, sends a DMRS to UE 2 on an antenna port 1001, sends a DMRS to UE 3 on an antenna port 1002, and sends a DMRS to UE 4 on an antenna port 1003. The DMRSs of the UE 1 and the UE 2 are code-division-based, and the DMRSs of the UE 3 and the UE 4 are code-division-based.

The DMRSs of the UE 1 and the UE 3 are time-frequency-division-based, and the DMRSs of the UE 2 and the UE 4 are time-frequency-division-based. To avoid mutual interference between the DMRSs of the UEs, all REs occupied by the DMRSs on the antenna ports 1000, 1001, 1002, and 1003 need to be bypassed when resource mapping is performed on data of the UEs.

For example, if the configuration type of the DMRS is DMRS configuration type 1 and the quantity of symbols occupied by the DMRS is 1, one port may correspond to six REs, and the following may be predefined: When UL-DMRS-config-type=1 and UL-DMRS-max-len=1, or when DL-DMRS-config-type=1 and DL-DMRS-max-len=1, the DMRS RE overhead value 12.

For example, if the configuration type of the DMRS is DMRS configuration type 1 and the quantity of symbols occupied by the DMRS is 2, one port may correspond to 12 REs, and the following may be predefined: When UL-DMRS-config-type=1 and UL-DMRS-max-len=2, or when DL-DMRS-config-type=1 and DL-DMRS-max-len=2, the DMRS RE overhead value is 24.

For example, if the configuration type of the DMRS is DMRS configuration type 2 and the quantity of symbols occupied by the DMRS is 1, one port may correspond to four REs, and the following may be predefined: When UL-DMRS-config-type=2 and UL-DMRS-max-len=1, or when DL-DMRS-config-type=2 and DL-DMRS-max-len=1, the DMRS RE overhead value is 8.

For example, if the configuration type of the DMRS is DMRS configuration type 2 and the quantity of symbols occupied by the DMRS is 2, one port may correspond to eight REs, and the following may be predefined: When UL-DMRS-config-type=2 and UL-DMRS-max-len=2, or when DL-DMRS-config-type=2 and DL-DMRS-max-len=2, the DMRS RE overhead value is 16.

Optionally, at least one of Z1, Z2, Z3, and Z4 may have a plurality of values. When one of Z1, Z2, Z3, and Z4 has a plurality of values, the base station 110 may inform, via signaling, the UE 120 of a specific DMRS RE overhead value.

For example, when values/a value of Z1 and/or Z2 may be selected from 6, 12, 18, and 24, the base station 110 may inform, via signaling, the UE 120 which one of 6, 12, 18, and 24 is specifically the DMRS RE overhead value.

For example, when values/a value of Z3 and/or Z4 may be selected from 4, 8, 12, 16, 20, and 24, the base station 110 may inform, via signaling, the UE 120 of which one of 4, 8, 12, 16, 20, or 24 is specifically the DMRS RE overhead value.

Optionally, a plurality of correspondences between one demodulation reference signal configuration type and one quantity of symbols occupied by demodulation reference signal, and DMRS RE overhead may be predefined. The base station may inform, via signaling, the UE of which correspondence should be used to calculate a TBS.

For example, a correspondence between demodulation reference signal configuration type 1 and quantity of symbols occupied by demodulation reference signal 1, and a DMRS RE overhead value may include at least one of the following correspondences:

a correspondence z1: DMRS configuration type 1 and quantity of symbols occupied by DMRS 1 correspond to the DMRS RE overhead value 6;

a correspondence z2: DMRS configuration type 1 and quantity of symbols occupied by DMRS 1 correspond to the DMRS RE overhead value 12;

a correspondence z3: DMRS configuration type 1 and quantity of symbols occupied by DMRS 1 correspond to the DMRS RE overhead value 18; and a correspondence z4: DMRS configuration type 1 and quantity of symbols occupied by DMRS 1 correspond to the DMRS RE overhead value 24.

The base station may inform, via higher layer signaling and/or physical layer signaling, the UE of which one of the plurality of correspondences between DMRS configuration type 1 and quantity of symbols occupied by DMRS 1, and DMRS RE overhead values may be used to determine the quantity of DMRSs.

For example, "00" represents the correspondence z1, "01" represents the correspondence z2, "10" represents the correspondence z3, and "ii" represents the correspondence z4.

For example, a correspondence between demodulation reference signal configuration type 1 and quantity of symbols occupied by demodulation reference signal 2, and a DMRS RE overhead value may include at least one of the following correspondences:

a correspondence z1': DMRS configuration type 1 and quantity of symbols occupied by DMRS 2 correspond to the DMRS RE overhead value 12;

a correspondence z2': DMRS configuration type 1 and quantity of symbols occupied by DMRS 2 correspond to the DMRS RE overhead value 18;

a correspondence z3': DMRS configuration type 1 and quantity of symbols occupied by DMRS 2 correspond to the DMRS RE overhead value 24; and a correspondence z4': DMRS configuration type 1 and quantity of symbols occupied by DMRS 2 correspond to a DMRS RE overhead value 36.

The base station may inform, via higher layer signaling and/or physical layer signaling, the UE of which one of the plurality of correspondences between DMRS configuration type 1 and quantity of symbols occupied by DMRS 2, and the DMRS RE overhead values may be used to determine a quantity of REs of a DMRS.

For example, "00" represents the correspondence z1', "01" represents the correspondence z2', "10" represents the correspondence z3', and "11" represents the correspondence z4'.

For example, a correspondence between demodulation reference signal configuration type 2 and quantity of symbols occupied by demodulation reference signal 1, and a DMRS RE overhead value may include at least one of the following correspondences:

a correspondence z1": DMRS configuration type 2 and quantity of symbols occupied by DMRS 1 correspond to the DMRS RE overhead value 4;

a correspondence z2": DMRS configuration type 2 and quantity of symbols occupied by DMRS 1 correspond to the DMRS RE overhead value 8;

a correspondence z3": DMRS configuration type 2 and quantity of symbols occupied by DMRS 1 correspond to the DMRS RE overhead value 12; and a correspondence z4": DMRS configuration type 2 and quantity of symbols occupied by DMRS 1 correspond to the DMRS RE overhead value 16.

The base station may inform, via higher layer signaling and/or physical layer signaling, the UE of which one of the plurality of correspondences between DMRS configuration type 2 and quantity of symbols occupied by DMRS 1, and the DMRS RE overhead values may be used to determine a DMRS RE overhead value.

For example, "00" represents the correspondence z1", "01" represents the correspondence z2", "10" represents the correspondence z3", and "le represents the correspondence z4".

For example, a correspondence between demodulation reference signal configuration type 2 and quantity of symbols occupied by demodulation reference signal 2, and a DMRS RE overhead value may include at least one of the following correspondences:

a correspondence z1'": DMRS configuration type 2 and quantity of symbols occupied by DMRS 2 correspond to the DMRS RE overhead value 8;

a correspondence z2'": DMRS configuration type 2 and quantity of symbols occupied by DMRS 2 correspond to the DMRS RE overhead value 16;

a correspondence z3'": DMRS configuration type 2 and quantity of symbols occupied by DMRS 2 correspond to the DMRS RE overhead value 24; and a correspondence z4'": DMRS configuration type 2 and quantity of symbols occupied by DMRS 2 correspond to a DMRS RE overhead value 32.

The base station may inform, via higher layer signaling and/or physical layer signaling, the UE which one of the plurality of correspondences between DMRS configuration type 2 and quantity of symbols occupied by DMRS 2, and the DMRS RE overhead values may be used to determine a DMRS RE overhead value.

For example, "00" represents the correspondence z1'", "01" represents the correspondence z2'", "10" represents the correspondence z3'", and "n" represents the correspondence z4'".

In a possible design manner, the first information may include a waveform. To be specific, a quantity, corresponding to the waveform, of resource elements occupied by the demodulation reference signal may be obtained based on the waveform. There is a correspondence between the waveform and the quantity of resource elements occupied by the demodulation reference signal.

Optionally, a correspondence between the waveform and a DMRS RE overhead may be predefined.

Optionally, the waveform may be a channel waveform, or may be a signal waveform. For example, the channel waveform may be a waveform of a physical uplink data channel, a waveform of a physical uplink control channel, a waveform of a physical downlink data channel, or a waveform of a physical downlink control channel. For example, the signal waveform may be a waveform of a reference signal, such as a waveform of a demodulation reference signal.

Optionally, the waveform may be classified into a single-carrier waveform and a multi-carrier waveform. Optionally, the waveform may be used to indicate whether transform precoding is enabled or the like.

For example, the following may be predefined: When the waveform is a single carrier waveform, that is, when transform precoding is enabled, the DMRS RE overhead value is W1, where W1 is an integer.

For example, the following may be predefined: When the waveform is a single carrier and only a DMRS of a configuration type 1 is supported in a case of the single carrier, the DMRS RE overhead value is 6.

For example, the following may be predefined: When the waveform is a multi-carrier, that is, transform precoding is not enabled, the DMRS RE overhead value is W2, where W2 is an integer.

For example, the following may be predefined: When the waveform is a multi-carrier, and a DMRS of a configuration type 2 may be supported in a case of the multi-carrier, the DMRS RE overhead value is 4.

For example, the following may be predefined: When the waveform is a multi-carrier, and a DMRS of a configuration type 1 may be supported in a case of the multi-carrier, the DMRS RE overhead value is 6.

Optionally, a value of W1 and/or W2 may be any one of 4, 6, 8, 12, 16, 24, and the like.

Optionally, W1 and/or W2 may have a plurality of values. When W1 and/or W2 have/has a plurality of values, the base station 110 may inform, via signaling, the UE 120 which one of the plurality of values is the DMRS RE overhead value.

For example, the following is predefined: W1 may be at least one of 6, 12, 18, 24, and the like. In this case, the base station 110 may inform, via signaling, the UE 120 which one of 6, 12, 18, and 24 is specifically the DMRS RE overhead value.

For example, the following is predefined: W2 may be at least one of 4, 8, 12, 16, 20, 24, or the like. In this case, the base station 110 may inform, via signaling, the UE 120 which one of 4, 8, 12, 16, 20, or 24 is specifically the DMRS RE overhead value.

Optionally, a plurality of correspondences between one waveform and DMRS RE overhead values may be predefined. The base station may inform, via signaling, the UE which correspondence should be used to calculate a TBS.

For example, a correspondence between a waveform and a DMRS RE overhead value may include at least one of the following correspondences:

a correspondence w1: a case in which transform precoding is not enabled corresponds to the DMRS RE overhead value 4;

a correspondence w2: a case in which transform precoding is not enabled corresponds to the DMRS RE overhead value 8;

a correspondence w3: a case in which transform precoding is enabled corresponds to the DMRS RE overhead value 6; and correspondence w4: a case in which transform precoding is enabled corresponds to the DMRS RE overhead value 12.

The base station may inform, via higher layer signaling and/or physical layer signaling, the UE of which one of the plurality of correspondences between a waveform and DMRS RE overhead values may be used to determine a DMRS RE overhead value.

For example, "00" represents the correspondence w1, "01" represents the correspondence w2, "10" represents the correspondence w3, and "n" represents the correspondence w4.

In a possible implementation, the first information may include a waveform and a quantity of symbols occupied by the demodulation reference signal. To be specific, a quantity, corresponding to the waveform and the quantity of symbols occupied by the demodulation reference signal, of resource elements occupied by the demodulation reference signal may be obtained based on the waveform and the quantity of symbols occupied by the demodulation reference signal. There is a correspondence between the waveform and the quantity of symbols occupied by the demodulation reference signal, and the quantity of resource elements occupied by the demodulation reference signal.

Optionally, the correspondence between the waveform and the quantity of symbols occupied by the DMRS, and a DMRS RE overhead value may be predefined.

For example, the following may be predefined: When a waveform is a single carrier waveform and a quantity of symbols occupied by an uplink DMRS (UL-DMRS-max-len) is 1, the DMRS RE overhead value is W3, where W3 is an integer.

For example, the following may be predefined: When the waveform is a single carrier waveform and UL-DMRS-max-len=1, the DMRS RE overhead value is 6.

For example, the following may be predefined: When the waveform is a single carrier waveform and UL-DMRS-max-len=2, the DMRS RE overhead value is W4, where W4 is an integer.

For example, the following may be predefined: When the waveform is a single carrier waveform and UL-DMRS-max-len=2, the DMRS RE overhead value is 12.

For example, the following may be predefined: When the waveform is a multi-carrier waveform and a quantity of symbols occupied by a downlink DMRS (DL-DMRS-max-len) is 1, or when the waveform is a multi-carrier waveform and UL-DMRS-max-len=1, the DMRS RE overhead value is W5, where W5 is an integer.

For example, the following may be predefined: When the waveform is a multi-carrier waveform and DL-DMRS-max-len=1, or when the waveform is a multi-carrier waveform and UL-DMRS-max-len=1, the DMRS RE overhead value is 4.

For example, the following may be predefined: When the waveform is a multi-carrier waveform and DL-DMRS-max-len=2, or when the waveform is a multi-carrier waveform or UL-DMRS-max-len=2, the DMRS RE overhead value is W6, where W6 is an integer.

For example, the following may be predefined: When the waveform is a multi-carrier waveform and DL-DMRS-max-len=2, or when the waveform is a multi-carrier waveform or UL-DMRS-max-len=2, the DMRS RE overhead value is 8.

Optionally, a value of W3 or W4 may be any one of 4, 6, 8, 12, 16, 24, and the like.

Optionally, W3 and/or W4 may have a plurality of values. When W3 and/or W4 have/has a plurality of values, the base station 110 may inform, via signaling, the UE 120 which one of the plurality of values is the DMRS RE overhead value.

For example, the following is predefined: W3 may be at least one of 6, 12, 18, 24, and the like. In this case, the base station 110 may inform, via signaling, the UE 120 which one of 6, 12, 18, and 24 is specifically the DMRS RE overhead value.

For example, the following is predefined: W4 may be at least one of 4, 8, 12, 16, 20, 24, or the like. In this case, the base station 110 may inform, via signaling, the UE 120 which one of 4, 8, 12, 16, 20, or 24 is specifically the DMRS RE overhead value.

Optionally, a plurality of correspondences between one waveform and one quantity of symbols occupied by DMRS, and DMRS RE overhead values may be predefined. The base station may inform, via signaling, the UE which correspondence should be used to calculate a TBS.

For example, a correspondence between a waveform with transform precoding not enabled and quantity of symbols occupied by DMRS 1, and a DMRS RE overhead value may include at least one of the following correspondences:

a correspondence w1': a case in which transform precoding is not enabled and a quantity of symbols occupied by DMRS is 1 corresponds to the DMRS RE overhead value 4;

a correspondence w2': a case in which transform precoding is not enabled and a quantity of symbols occupied by DMRS is 1 corresponds to the DMRS RE overhead value 8;

a correspondence w3: a case in which transform precoding is not enabled and a quantity of symbols occupied by DMRS is 1 corresponds to the DMRS RE overhead value 12; and a correspondence w4': a case in which transform precoding is not enabled and a quantity of symbols occupied by DMRS is 1 corresponds to the DMRS RE overhead value 16.

The base station may inform, via higher layer signaling and/or physical layer signaling, the UE which one of the plurality of correspondences between a waveform and DMRS RE overhead values may be used to determine a DMRS RE overhead value.

For example, "00" represents the correspondence w1', "01" represents the correspondence w2', "10" represents the correspondence w3', and "11" represents the correspondence w4'.

For example, a correspondence between a waveform with transform precoding not enabled and quantity of symbols occupied by DMRS 2, and a DMRS RE overhead value may include at least one of the following correspondences:

a correspondence w1": a case in which transform precoding is not enabled and a quantity of symbols occupied by DMRS is 2 corresponds to the DMRS RE overhead value 8;

a correspondence w2": a case in which transform precoding is not enabled and a quantity of symbols occupied by DMRS is 2 corresponds to the DMRS RE overhead value 16;

a correspondence w3": a case in which transform precoding is not enabled and a quantity of symbols occupied by DMRS is 2 corresponds to the DMRS RE overhead value 24; and correspondence w4": a case in which transform precoding is not enabled and a quantity of symbols occupied by DMRS is 2 corresponds to a DMRS RE overhead value 36.

The base station may inform, via higher layer signaling and/or physical layer signaling, the UE which one of the plurality of correspondences between a waveform and DMRS RE overhead values may be used to determine a DMRS RE overhead value.

For example, "00" represents the correspondence w1", "01" represents the correspondence w2", "10" represents the correspondence w3", and "11" represents the correspondence w4".

For example, a correspondence between a waveform with transform precoding enabled and quantity of symbols occupied by DMRS 1, and a DMRS RE overhead value may include at least one of the following correspondences:

a correspondence w1'": a case in which transform precoding is enabled and a quantity of symbols occupied by DMRS is 1 corresponds to the DMRS RE overhead value 6;

a correspondence w2'": a case in which transform precoding is enabled and a quantity of symbols occupied by DMRS is 1 corresponds to the DMRS RE overhead value 12;

correspondence w3'": a case in which transform precoding is enabled and a quantity of symbols occupied by DMRS is 1 corresponds to the DMRS RE overhead value 18; and correspondence w4'": a case in which transform precoding is enabled and a quantity of symbols occupied by DMRS is 1 corresponds to the DMRS RE overhead value 24.

The base station may inform, via higher layer signaling and/or physical layer signaling, the UE which one of the plurality of correspondences between a waveform and DMRS RE overhead values may be used to determine a DMRS RE overhead value.

For example, "00" represents the correspondence w1'", "01" represents the correspondence w2", "10" represents the correspondence w3", and "11" represents the correspondence w4".

For example, a correspondence between a waveform with transform precoding enabled and quantity of symbols occupied by DMRS 2, and a DMRS RE overhead value may include at least one of the following correspondences:

a correspondence w1" ": a case in which transform precoding is enabled and a quantity of symbols occupied by DMRS is 2 corresponds to the DMRS RE overhead value 12;

a correspondence w2": a case in which transform precoding is enabled and a quantity of symbols occupied by DMRS is 2 corresponds to the DMRS RE overhead value 24;

a correspondence w3": a case in which transform precoding is enabled and a quantity of symbols occupied by DMRS is 2 corresponds to a DMRS RE overhead value 36; and correspondence w4" ": a case in which transform precoding is enabled and a quantity of symbols occupied by DMRS is 2 corresponds to a DMRS RE overhead value 48.

The base station may inform, via higher layer signaling and/or physical layer signaling, the UE which one of the plurality of correspondences between a waveform and DMRS RE overhead values may be used to determine a DMRS RE overhead value.

For example, "00" represents the correspondence w1" ", "01" represents the correspondence w2", "10" represents the correspondence w3", and "11" represents the correspondence w4" ".

In a possible design manner, the first information may include a waveform, the configuration type of the demodulation reference signal, and the quantity of symbols occupied by the demodulation reference signal. To be specific, a demodulation reference signal RE overhead may be obtained based on the waveform, the configuration type of the demodulation reference signal, and the quantity of symbols occupied by the demodulation reference signal. There is a correspondence between the demodulation reference signal RE overhead value, and the waveform, the configuration type of the demodulation reference signal, and the quantity of symbols occupied by the demodulation reference signal.

Optionally, the first information may include a waveform, the configuration type of the DMRS, and the quantity of symbols occupied by the DMRS, and the correspondence between the DMRS RE overhead value, and the waveform, the configuration type of the DMRS, and the quantity of symbols occupied by the DMRS may be predefined.

For example, the following may be predefined: When the waveform is a multi-carrier waveform, DL-DMRS-config-type=1, and DL-DMRS-max-len=1, or when the waveform is a multi-carrier waveform, UL-DMRS-config-type=1, and UL-DMRS-max-len=1, the DMRS RE overhead value is W7, and W7 is an integer.

For example, the following may be predefined: When the waveform is a multi-carrier waveform, DL-DMRS-config-type=1, and DL-DMRS-max-len=1, or when the waveform is a multi-carrier waveform, UL-DMRS-config-type=1, and UL-DMRS-max-len=1, the DMRS RE overhead value is 6.

For example, the following may be predefined: When the waveform is a multi-carrier waveform, DL-DMRS-config-type=1, and DL-DMRS-max-len=2, or when the waveform is a multi-carrier waveform, UL-DMRS-config-type=1, and UL-DMRS-max-len=2, the DMRS RE overhead value is W8, where W8 is an integer.

For example, the following may be predefined: When the waveform is a multi-carrier waveform, DL-DMRS-config-type=1, and DL-DMRS-max-len=2, or when the waveform is a multi-carrier waveform, UL-DMRS-config-type=1, and UL-DMRS-max-len=2, the DMRS RE overhead value is 12.

For example, the following may be predefined: When the waveform is a multi-carrier waveform, DL-DMRS-config-type=2, and DL-DMRS-max-len=1, or when the waveform is a multi-carrier waveform, UL-DMRS-config-type=2, and UL-DMRS-max-len=1, the DMRS RE overhead value is W9, where W9 is an integer. In this case, an example of W9 is 4.

For example, the following may be predefined: When the waveform is a multi-carrier waveform, DL-DMRS-config-type=2, and DL-DMRS-max-len=2, or when the waveform is a multi-carrier waveform, UL-DMRS-config-type=2, and UL-DMRS-max-len=2, the DMRS RE overhead value is W10, where Win is an integer. An example of Win is 8.

Optionally, a value of any one of W1 to Win may be 4, 6, 8, 12, 16, 18, 24, 36, 48, or the like. Values of any two of W1 to Win may be the same, or may be different. This is not limited.

Optionally, DMRSs of different UEs may be code-division-based (namely, orthogonal sequences), or may be time-frequency-division-based (in other words, positions of REs occupied by DMRSs of different UEs are different). When time-frequency division is performed on DMRSs of different UEs, to reduce mutual interference between the DMRSs of the UEs, data signals are mapped to none of the REs occupied by the DMRSs of the UEs. In other words, all the REs occupied by the DMRSs of the UEs need to be bypassed when data mapping is performed. In this case, a predefined DMRS RE overhead value should be the sum of DMRS RE overhead values of all the UEs.

For example, the base station 110 sends a DMRS to UE 1 on an antenna port 1000, sends a DMRS to UE 2 on an antenna port 1001, sends a DMRS to UE 3 on an antenna port 1002, and sends a DMRS to UE 4 on an antenna port 1003. The DMRSs of the UE 1 and the UE 2 are code-division-based, and the DMRSs of the UE 3 and the UE 4 are code-division-based. The DMRSs of the UE 1 and the UE 3 are time-frequency-division-based, and the DMRSs of the UE 2 and the UE 4 are time-frequency-division-based. To avoid mutual interference between the DMRSs of the UEs, all REs occupied by the DMRSs on the antenna ports 1000, 1001, 1002, and 1003 need to be bypassed when resource mapping is performed on data of the UEs.

For example, if the configuration type of the DMRS is DMRS configuration type 1, one port may correspond to six REs, and the following may be predefined: When the waveform is a multi-carrier waveform, UL-DMRS-config-type=1, and UL-DMRS-max-len=1, or when the waveform is a multi-carrier waveform, DL-DMRS-config-type=1, and DL-DMRS-max-len=1, the DMRS RE overhead value is 12.

For example, if the configuration type of the DMRS is DMRS configuration type 1, one port may correspond to 12 REs, and the following may be predefined: When the waveform is a multi-carrier waveform, UL-DMRS-config-type=1, and UL-DMRS-max-len=2, or when the waveform is a multi-carrier waveform, DL-DMRS-config-type=1, and DL-DMRS-max-len=2, the DMRS RE overhead value is 24.

For example, if the configuration type of the DMRS is DMRS configuration type 2, one port may correspond to four REs, and the following may be predefined: When the waveform is a multi-carrier waveform, UL-DMRS-config-type=2, and UL-DMRS-max-len=1, or when the waveform is a multi-carrier waveform, DL-DMRS-config-type=2, and DL-DMRS-max-len=1, the DMRS RE overhead value is 8.

For example, if the configuration type of the DMRS is DMRS configuration type 2, one port may correspond to eight REs, and the following may be predefined: When the waveform is a multi-carrier waveform, UL-DMRS-config-type=2, and UL-DMRS-max-len=2, or when the waveform is a multi-carrier waveform, DL-DMRS-config-type=2, and DL-DMRS-max-len=2, the DMRS RE overhead value is 16.

Optionally, the following may be predefined: Any one of W1 to W10 has a plurality of values. When the following is predefined: any one of W1 to W10 has a plurality of values, the base station may inform, via signaling, the UE of a specific DMRS RE overhead value.

For example, if the following is predefined: at least one of W1 to W8 may be 6, 12, 18, 24, or the like, the base station may inform, via signaling, the UE which one of 6, 12, 18, or 24 is specifically the DMRS RE overhead value.

For example, if the following is predefined: any one of W2, W4, W5, W9 or W10 may be 4, 8, 12, 16, 20, 24, or the like, the base station may inform, via signaling, the UE which one of 4, 8, 12, 16, 20, and 24 is specifically the DMRS RE overhead value.

In a possible design manner, the first information may include the type of the data channel and/or the radio network temporary identifier (RNTI) scrambling manner of the downlink control information. To be specific, a demodulation reference signal RE overhead value may be obtained based on the type of the data channel and/or the RNTI scrambling manner of the downlink control information. There is a correspondence between the type of the data channel and/or the RNTI scrambling manner of the downlink control information, and the demodulation reference signal RE overhead value.

Optionally, the correspondence between the type of the data channel and/or the RNTI scrambling manner of the DCI, and the DMRS RE overhead value may be predefined.

There may be a plurality of types of data channels between the base station and the UE.

Optionally, the type of the data channel may include at least one of uplink data transmission and downlink data transmission.

Optionally, the type of the data channel includes at least one of system information, broadcast information, unicast information, and multicast information.

For example, some physical data shared channels (physical downlink sharing channels, PDSCH) are used to transmit unicast data of UE, some PDSCHs are used to transmit system information, broadcast information, or multicast information, some PDSCHs are used to transmit paging (P) information, and some PDSCHs may be used to transmit a random access response (RAR). The unicast data is UE-specific data, and the multicast information or the broadcast information is data that can be received by a plurality of UEs at the same time.

For example, some uplink data shared channels (physical uplink sharing channel, PUSCH) are used to transmit unicast data of UE, and some PUSCHs are used to transmit a random access message 3.

For example, a communication procedure is as follows. User equipment firstly performs downlink synchronization, receives a downlink synchronization signal, enters an RRC connected mode, then receives RRC signaling and physical layer signaling, and perform downlink data transmission. In addition, after entering the RRC connected mode, the user equipment may perform uplink random access. The base station sends a random access response, and the user equipment completes uplink synchronization and performs uplink data transmission.

For example, the UE needs to receive DCI before receiving a PDSCH. Information bits of the DCI include a cyclic redundancy check (CRC) code.

Optionally, the CRC may be related to an RNTI. For example, DCI for remaining minimum system information (RMSI) may be scrambled by using CRC generated based on an RMSI-RNTI. DCI for paging may be scrambled by using CRC generated based on a P-RNTI. DCI for a RAR may be scrambled by using CRC generated based on a RA-RNTI. DCI for a user-level data channel may be scrambled by using CRC generated based on a cell (C)-RNTI.

For example, for a data channel used to transmit RMSI, paging, message 3, a RAR, and/or the like, a data channel scheduled by DCI before a radio resource control (RRC) connected mode is entered, or a data channel scheduled by DCI scrambled based on an RMSI-RNTI, an SI-RNRI, a P-RNTI, or a RA-RNTI, the following may be predefined: The DMRS RE overhead value is 4, 6, or the like.

Optionally, for the data channel used to transmit the RMSI, the paging, the message 3, the RAR, and/or the like, the data channel scheduled by the DCI before the radio resource control (RRC) connected mode is entered, or the data channel scheduled by the DCI scrambled based on the RMSI-RNTI, the SI-RNRI, the P-RNTI, or the RA-RNTI, the DMRS RE overhead value may be predefined on the UE, or may be notified by the base station.

Optionally, a same DMRS RE overhead value or different DMRS RE overhead values may be predefined for different data channels.

For example, for uplink data scheduling, that the DMRS RE overhead value is 6 may be predefined; and for downlink data scheduling, that the DMRS RE overhead value is 4 may be predefined.

Optionally, a DMRS RE overhead configured on UE for a data channel scheduled after the RRC connected mode is entered and/or a data channel scheduled by DCI scrambled based on a C-RNTI may be predefined on the UE, or may be notified by the base station.

Optionally, a plurality of DMRS RE overheads may be predefined for a same data channel, and then the base station notifies, by signaling, the UE of the DMRS RE overhead.

In a possible design manner, the first information includes the quantity of symbols occupied by the data block. To be specific, a quantity, corresponding to the quantity of symbols occupied by the data block, of resource elements occupied by the demodulation reference signal may be obtained based on the quantity of symbols occupied by the data block. There is a correspondence between the quantity of symbols occupied by the data block and the quantity of resource elements occupied by the demodulation reference signal.

Optionally, a correspondence between the quantity of symbols occupied by the data block and a DMRS RE overhead may be predefined.

For example, the following may be predefined: When the quantity of symbols occupied by the data block is less than 7, the DMRS RE overhead value is 4 or 6. This is because when the quantity of symbols occupied by the data block is less than 7, only a front load DMRS but no additional DMRS may be transmitted in a time unit (for example, 14 symbols) used for data block transmission.

For example, the following may be predefined: When the quantity of symbols occupied by the data block is greater than or equal to 7, the DMRS RE overhead value is 8 or 12. This is because when the quantity of symbols occupied by the data block is greater than or equal to 7, not only a front load DMRS but also an additional DMRS may be transmitted in a time unit (for example, 14 symbols) used for data block transmission.

The front load DMRS is a DMRS that occupies a front symbol in DMRSs transmitted in a time unit, and the additional DMRS is a DMRS that occupies a rear symbol in the DMRSs transmitted in the time unit.

The front loaded DMRS may also be referred to as a basic DMRS, and may be placed at a start position or a relative front position of data. The additional DMRS may also be referred to as an additional DMRS. The basic DMRS and the additional DMRS may be carried at different symbol positions of a same scheduling unit. The same scheduling unit includes at least any one of a subframe, a slot, or a mini-slot. This is not specifically limited in this embodiment of this application.

Optionally, it is specified that the additional DMRS may be used to improve channel estimation accuracy, and is applicable to a high-speed moving scenario. When channel status on different symbols changes, the additional DMRS is introduced to improve the channel estimation accuracy.

Figure 4:
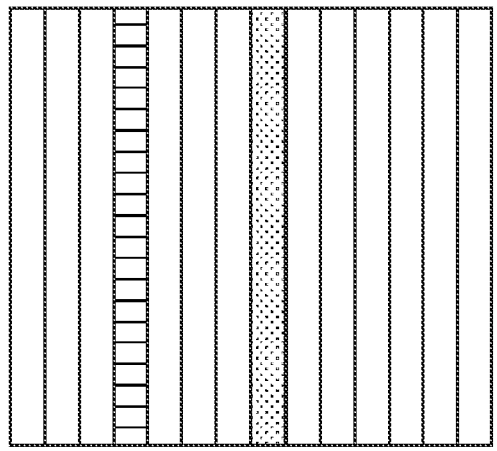
FIG. 4 is a schematic diagram of a DMRS pattern according to another embodiment of this application.
Figure 5:
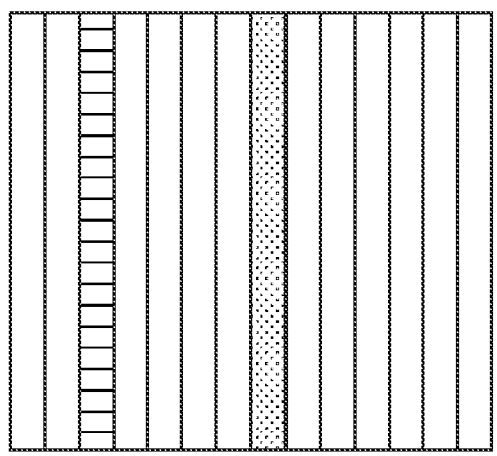
FIG. 5 is a schematic diagram of a DMRS pattern according to another embodiment of this application.

FIG. 4 and FIG. 5 are schematic diagrams of a front loaded DMRS and an additional DMRS. In FIG. 4 and FIG. 5, a symbol filled with horizontal lines is a symbol occupied by a basic DMRS, namely, a symbol occupied by a front-loaded DMRS, and a symbol filled with points is a symbol occupied by an additional DMRS.

In FIG. 4, the front loaded DMRS is on a symbol 3 (namely, the fourth symbol), and the additional DMRS is on a symbol 7 (namely, the eighth symbol). In FIG. 5, the front loaded DMRS is on a symbol 2 (namely, the third symbol), and the additional DMRS is on a symbol 7 (namely, the eighth symbol).

To obtain a more accurate TBS during TBS calculation, a quantity of REs of DMRSs including the front-loaded DMRS and the additional DMRS that are actually transmitted by the base station needs to be considered when overheads of the DMRSs are considered. This is because data is mapped to none of the REs of the DMRSs.

In a possible design manner, the first information includes the position of the symbol occupied by the data block. To be specific, a quantity, corresponding to the position of the symbol occupied by the data block, of resource elements occupied by the demodulation reference signal may be obtained based on the position of the symbol occupied by the data block. There is a correspondence between the position of the symbol occupied by the data block and the quantity of resource elements occupied by the demodulation reference signal.

Optionally, a correspondence between the position of the symbol occupied by the data block and a DMRS RE overhead may be predefined.

For example, the following may be predefined: When the last symbol occupied by the data block is previous to the ninth symbol in a time unit (for example, 14 symbols) used for data block transmission, the DMRS RE overhead value is 4 or 6. This is because the quantity of symbols occupied by the data block may be less than 7 in this case. In other words, only a front load DMRS but no additional DMRS may be transmitted in the time unit used for data block transmission.

That the last symbol occupied by the data block is previous to the ninth symbol in a time unit used for data block transmission may be understood as follows: An index of the last symbol occupied by the data block is less than 8.

For example, the following may be predefined: When the last symbol occupied by the data block is on or follows the ninth symbol in a time unit (for example, 14 symbols) used for data block transmission, the DMRS RE overhead value is 8 or 12. This is because the quantity of symbols occupied by the data block may be greater than or equal to 7 in this case. In other words, not only a front load DMRS but also an additional DMRS may be transmitted in a time unit used for data block transmission.

That the last symbol occupied by the data block is on or follows the ninth symbol in a time unit used for data block transmission may be understood as follows: An index of the last symbol occupied by the data block is greater than or equal to 8.

In a possible design manner, the first information may include a position of a symbol occupied by an additional DMRS and/or a quantity (or a number) of additional DMRSs. To be specific, a quantity, corresponding to the position of the symbol occupied by the additional DMRS and/or the quantity (or the number) of additional DMRSs, of resource elements occupied by the demodulation reference signal may be obtained based on the position of the symbol occupied by the additional DMRS and/or the quantity (or the number) of additional DMRSs. There is a correspondence between the position of the symbol occupied by additional DMRS and/or the quantity (or the number) of additional DMRSs and the quantity of resource elements occupied by the demodulation reference signal.

Optionally, a correspondence between the quantity (or the number) of additional DMRSs and/or the position of the symbol occupied by the additional DMRS and a DMRS RE overhead value may be predefined.

DL-DMRS-add-pos or UL-DMRS-add-pos may be used to indicate the quantity of additional DMRSs, or may be used to indicate the number of additional DMRSs, for example, may be at least one of 0, 1, 2, and 3.

Optionally, when a quantity of symbols occupied by a front load DMRS is 1, if the quantity of additional DMRSs is 0, it indicates that there are 0 additional-DMRS-occupied symbols; if the quantity of additional DMRSs is 1, it indicates that there is 1 additional-DMRS-occupied symbol; if the quantity of additional DMRSs is 2, it indicates that there are 2 additional-DMRS-occupied symbols; or if the quantity of additional DMRSs is 3, it indicates that there are 3 additional-DMRS-occupied symbols.

Optionally, when a quantity of symbols occupied by a front load DMRS is 2, if the quantity of additional DMRSs cis 0, it indicates that there are 0 additional-DMRS-occupied symbols; if the quantity of additional DMRSs is 1, it indicates that there are 2 additional-DMRS-occupied symbols; if the quantity of additional DMRSs is 2, it indicates that there are 4 additional-DMRS-occupied symbols; or if the quantity of additional DMRSs is 3, it indicates that there are 6 additional-DMRS-occupied symbols.

DL-DMRS-add-pos or UL-DMRS-add-pos may also be used to indicate the position of the symbol occupied by the additional DMRS, for example, may be at least one of 0, 1, 2, and 3.

Optionally, the position of the symbol occupied by the additional DMRS may alternatively be understood as follows: The position of the symbol occupied by the additional DMRS is a quantity of front load DMRS positions, for example, may be at least one of 0, 1, 2, and 3.

Optionally, when a quantity of symbols occupied by a front load DMRS is 1, if the position of the symbol occupied by the additional DMRS is 0, it indicates that the additional DMRS occupies 0 front load DMRS positions, that is, the additional DMRS occupies 0 symbols; if the position of the symbol occupied by the additional DMRS is 1, it indicates that the additional DMRS occupies 1 front load DMRS position, that is, the additional DMRS occupies 1 symbol; if the position of the symbol occupied by the additional DMRS is 2, it indicates that the additional DMRS occupies 2 front load DMRS positions, that is, the additional DMRS occupies 2 symbols; or if the position of the symbol occupied by the additional DMRS is 3, it indicates that the additional DMRS occupies 3 front load DMRS positions, that is, the additional DMRS occupies 3 symbols.

Optionally, when a quantity of symbols occupied by a front load DMRS is 2, if the position of the symbol occupied by the additional DMRS is 0, it indicates that the additional DMRS occupies 0 front load DMRS positions, that is, the additional DMRS occupies 0 symbols; if the position of the symbol occupied by the additional DMRS is 1, it indicates that the additional DMRS occupies 1 front load DMRS position, that is, the additional DMRS occupies 2 symbols; if the position of the symbol occupied by the additional DMRS is 2, it indicates that the additional DMRS occupies 2 front load DMRS positions, that is, the additional DMRS occupies 4 symbols; or if the position of the symbol occupied by the additional DMRS is 3, it indicates that the additional DMRS occupies 3 front load DMRS positions, that is, the additional DMRS occupies 6 symbols.

Optionally, additional DMRSs may be classified into an uplink additional DMRS and a downlink additional DMRS. A position of a symbol occupied by the uplink additional DMRS and a position of a symbol occupied by the downlink additional DMRS may be respectively represented by a parameter "UL-DMRS-add-pos" and a parameter "DL-DMRS-add-pos".

Optionally, the position of the symbol occupied by the uplink additional DMRS and the position of the symbol occupied by the downlink additional DMRS may be indicated by using a same parameter. Details are not limited in this application.

Optionally, the following may be predefined: When DL-DMRS-add-pos=0 or UL-DMRS-add-pos=0, the DMRS RE overhead value is Q1, where Q1 is an integer.

For example, the following may be predefined: When DL-DMRS-add-pos=1 or UL-DMRS-add-pos=1, the DMRS RE overhead value is Q2, where Q2 is an integer.

For example, the following may be predefined: When DL-DMRS-add-pos=2 or UL-DMRS-add-pos=2, the DMRS RE overhead value is Q3, where Q3 is an integer.

For example, the following may be predefined: When DL-DMRS-add-pos=3 or UL-DMRS-add-pos=3, the DMRS RE overhead value is Q4, where Q4 is an integer.

For example, the following may be predefined: When DL-DMRS-add-pos=0 or UL-DMRS-add-pos=0, the DMRS RE overhead value is 4 or 6.

For example, the following may be predefined: When DL-DMRS-add-pos=1 or UL-DMRS-add-pos=1, the DMRS RE overhead value is 8 or 12.

For example, the following may be predefined: When DL-DMRS-add-pos=2 or UL-DMRS-add-pos=2, the DMRS RE overhead value is 12 or 18.

For example, the following may be predefined: When DL-DMRS-add-pos=3 or UL-DMRS-add-pos=3, the DMRS RE overhead value is 16 or 24.

Optionally, values of Q1, Q2, Q3, and Q4 may be the same or different. This is not specifically limited. A value of any one of Q1, Q2, Q3, and Q4 may be 4, 6, 8, 12, 16, 18, 24, or the like.

Optionally, at least one of Q1, Q2, Q3, and Q4 may have a plurality of values. When one of Q1, Q2, Q3, and Q4 has a plurality of values, the base station 110 may inform, via signaling, the UE 120 of a specific DMRS RE overhead value.

In a possible design manner, the first information may include the configuration type of the DMRS, the quantity of symbols occupied by the DMRS, and the quantity of symbols occupied by the data block. To be specific, a quantity, corresponding to the configuration type of the DMRS, the quantity of symbols occupied by the DMRS, and the quantity of symbols occupied by the data block, of resource elements occupied by the demodulation reference signal may be obtained based on the configuration type of the DMRS, the quantity of symbols occupied by the DMRS, and the quantity of symbols occupied by the data block. There is a correspondence between the configuration type of the DMRS, the quantity of symbols occupied by the DMRS, and the quantity of symbols occupied by the data block, and the quantity of resource elements occupied by the demodulation reference signal.

Optionally, a correspondence between a DMRS RE overhead value, and the configuration type of the DMRS, the quantity of symbols occupied by the DMRS, and the quantity of symbols occupied by the data block may be predefined.

Optionally, for example, the following may be predefined: When DL-DMRS-config-type=1, DL-DMRS-max-len=1, and the quantity of symbols occupied by the data block is less than 7, or when UL-DMRS-config-type=1, UL-DMRS-max-len=1, and the quantity of symbols occupied by the data block is less than 7, the DMRS RE overhead value is P1, where P1 is an integer.

For example, the following may be predefined: When DL-DMRS-config-type=1, DL-DMRS-max-len=2, and the quantity of symbols occupied by the data block is less than 7, or when UL-DMRS-config-type=1, UL-DMRS-max-len=2, and the quantity of symbols occupied by the data block is less than 7, the DMRS RE overhead value is P2, where P2 is an integer.

For example, the following may be predefined: When DL-DMRS-config-type=2, DL-DMRS-max-len=1, and the quantity of symbols occupied by the data block is less than 7, or when UL-DMRS-config-type=2, UL-DMRS-max-len=1, and the quantity of symbols occupied by the data block is less than 7, the DMRS RE overhead value is P3, where P3 is an integer.

For example, the following may be predefined: When DL-DMRS-config-type=2, DL-DMRS-max-len=2, and the quantity of symbols occupied by the data block is less than 7, or when UL-DMRS-config-type=2, UL-DMRS-max-len=2, and the quantity of symbols occupied by the data block is less than 7, the DMRS RE overhead value is P4, where P4 is an integer.

For example, the following may be predefined: When DL-DMRS-config-type=1, DL-DMRS-max-len=1, and the quantity of symbols occupied by the data block is greater than or equal to 7, or when UL-DMRS-config-type=1, UL-DMRS-max-len=1, and the quantity of symbols occupied by the data block is greater than or equal to 7, the DMRS RE overhead value is P5, where P5 is an integer.

For example, the following may be predefined: When DL-DMRS-config-type=1, DL-DMRS-max-len=2, and the quantity of symbols occupied by the data block is greater than or equal to 7, or when UL-DMRS-config-type=1, UL-DMRS-max-len=2, and the quantity of symbols occupied by the data block is greater than or equal to 7, the DMRS RE overhead value is P6, where P6 is an integer.

For example, the following may be predefined: When DL-DMRS-config-type=2, DL-DMRS-max-len=1, and the quantity of symbols occupied by the data block is greater than or equal to 7, or when UL-DMRS-config-type=2, UL-DMRS-max-len=1, and the quantity of symbols occupied by the data block is greater than or equal to 7, the DMRS RE overhead value is P7, where P7 is an integer.

For example, the following may be predefined: When DL-DMRS-config-type=2, DL-DMRS-max-len=2, the quantity of symbols occupied by the data block is greater than or equal to 7, or when UL-DMRS-config-type=2, UL-DMRS-max-len=2, and the quantity of symbols occupied by the data block is greater than or equal to 7, the DMRS RE overhead value is P8, where P8 is an integer.

Optionally, a value of any one of P1 to P8 may be 4, 6, 8, 12, 16, 18, 20, 24, 28, 32, 36, or the like.

For example, the following may be predefined: When DL-DMRS-config-type=1, DL-DMRS-max-len=1, and the quantity of symbols occupied by the data block is less than 7, or when UL-DMRS-config-type=1, UL-DMRS-max-len=1, and the quantity of symbols of the data block is less than 7, the DMRS RE overhead value is 6.

For example, the following may be predefined: When DL-DMRS-config-type=1, DL-DMRS-max-len=2, and the quantity of symbols occupied by the data block is less than 7, or when UL-DMRS-config-type=1, UL-DMRS-max-len=2, and the quantity of symbols occupied by the data block is less than 7, the DMRS RE overhead value is 12.

For example, the following may be predefined: When DL-DMRS-config-type=2, DL-DMRS-max-len=1, and the quantity of symbols occupied by the data block is less than 7, or when UL-DMRS-config-type=2, UL-DMRS-max-len=1, and the quantity of symbols occupied by the data block is less than 7, the DMRS RE overhead value is 4.

For example, the following may be predefined: When DL-DMRS-config-type=2, DL-DMRS-max-len=2, and the quantity of symbols occupied by the data block is less than 7, or when UL-DMRS-config-type=2, UL-DMRS-max-len=2, and the quantity of symbols occupied by the data block is less than 7, the DMRS RE overhead value is 8.

For example, the following may be predefined: When DL-DMRS-config-type=1, DL-DMRS-max-len=1, and the quantity of symbols occupied by the data block is greater than or equal to 7, or when UL-DMRS-config-type=1, UL-DMRS-max-len=1, and the quantity of symbols occupied by the data block is greater than or equal to 7, the DMRS RE overhead value is 12.

For example, the following may be predefined: When DL-DMRS-config-type=1, DL-DMRS-max-len=2, and the quantity of symbols occupied by the data block is greater than or equal to 7, or when UL-DMRS-config-type=1, UL-DMRS-max-len=2, and the quantity of symbols occupied by the data block is greater than or equal to 7, the DMRS RE overhead value is 24.

For example, the following may be predefined: When DL-DMRS-config-type=2, DL-DMRS-max-len=1, and the quantity of symbols occupied by the data block is greater than or equal to 7, or when UL-DMRS-config-type=2, UL-DMRS-max-len=1, and the quantity of symbols occupied by the data block is greater than or equal to 7, the DMRS RE overhead value is 8.

For example, the following may be predefined: When DL-DMRS-config-type=2, DL-DMRS-max-len=2, and the quantity of symbols occupied by the data block is greater than or equal to 7, or when UL-DMRS-config-type=2, UL-DMRS-max-len=2, and the quantity of symbols occupied by the data block is greater than or equal to 7, the DMRS RE overhead value is 16.

In a possible design manner, the first information may include the configuration type of the DMRS, the quantity of symbols occupied by the DMRS, the quantity of symbols occupied by the data block, and a position of a symbol occupied by an additional DMRS. To be specific, a correspondence between the configuration type of the DMRS, the quantity of symbols occupied by the DMRS, the quantity of symbols occupied by the data block, and the position of the symbol occupied by the additional DMRS, and a DMRS RE overhead value may be predefined. The DMRS is a DMRS used when the data block is received.

For example, the following may be predefined: When DL-DMRS-config-type=1, DL-DMRS-max-len=1, DL-DMRS-add-pos=2, and the quantity of symbols occupied by the data block is greater than or equal to 7, or when UL-DMRS-config-type=1, UL-DMRS-max-len=1, UL-DMRS-add-pos=2, and the quantity of symbols occupied by the data block is greater than or equal to 7, the DMRS RE overhead value is 18.

For example, the following may be predefined: When DL-DMRS-config-type=1, DL-DMRS-max-len=2, DL-DMRS-add-pos=2, and the quantity of symbols occupied by the data block is greater than or equal to 7, or when UL-DMRS-config-type=1, UL-DMRS-max-len=2, UL-DMRS-add-pos=2, and the quantity of symbols occupied by the data block is greater than or equal to 7, the DMRS RE overhead value is 36.

For example, the following may be predefined: When DL-DMRS-config-type=2, DL-DMRS-max-len=1, DL-DMRS-add-pos=2, and the quantity of symbols occupied by the data block is greater than or equal to 7, or when UL-DMRS-config-type=2, UL-DMRS-max-len=1, UL-DMRS-add-pos=2, and the quantity of symbols occupied by the data block is greater than or equal to 7, the DMRS RE overhead value is 12.

For example, the following may be predefined: When DL-DMRS-config-type=2, DL-DMRS-max-len=2, DL-DMRS-add-pos=2, and the quantity of symbols occupied by the data block is greater than or equal to 7, or when UL-DMRS-config-type=2, UL-DMRS-max-len=2, UL-DMRS-add-pos=2, and the quantity of symbols occupied by the data block is greater than or equal to 7, the DMRS RE overhead value is 24.

For example, the following may be predefined: When DL-DMRS-config-type=1, DL-DMRS-max-len=1, DL-DMRS-add-pos=3, and the quantity of symbols occupied by the data block is greater than or equal to 7, or when UL-DMRS-config-type=1. UL-DMRS-max-len=1, UL-DMRS-add-pos=3, and the quantity of symbols occupied by the data block is greater than or equal to 7, the DMRS RE overhead value is 24.

For example, the following may be predefined: When DL-DMRS-config-type=1, DL-DMRS-max-len=2, DL-DMRS-add-pos=3, and the quantity of symbols occupied by the data block is greater than or equal to 7, or when UL-DMRS-config-type=1, UL-DMRS-max-len=2, UL-DMRS-add-pos=3, and the quantity of symbols occupied by the data block is greater than or equal to 7, the DMRS RE overhead value is 48.

For example, the following may be predefined: When DL-DMRS-config-type=2, DL-DMRS-max-len=1, DL-DMRS-add-pos=3, and the quantity of symbols occupied by the data block is greater than or equal to 7, or when UL-DMRS-config-type=2, UL-DMRS-max-len=1, UL-DMRS-add-pos=3, and the quantity of symbols occupied by the data block is greater than or equal to 7, the DMRS RE overhead value is 16.

For example, the following may be predefined: When DL-DMRS-config-type=2, DL-DMRS-max-len=2, DL-DMRS-add-pos=3, and the quantity of symbols occupied by the data block is greater than or equal to 7, or when UL-DMRS-config-type=2, UL-DMRS-max-len=2, UL-DMRS-add-pos=3, and the quantity of symbols occupied by the data block is greater than or equal to 7, the DMRS RE overhead value is 32.

Optionally, at least one of P1 to P8 may have a plurality of values. When at least one of P1 to P8 has a plurality of values, the base station no may inform, via signaling, the UE 120 which one of the plurality of values is the DMRS RE overhead value.

Optionally, the first information may further include a position of a DMRS in a case of a downlink PDSCH mapping type A (DL-DMRS-typeA-pos). When DL-DMRS-typeA-pos=2, there may be three additional DMRSs in a time unit used for data block transmission. Therefore, a predefined DMRS RE overhead value may be different from a DMRS RE overhead value specific to a case in which DL-DMRS-typeA-pos is not equal to 2.

DL-DMRS-typeA-pos may be used to indicate the position of the DMRS in the case of the PDSCH mapping type A. Optionally, the position of the DMRS (a position of the first symbol of the DMRS) may be the third symbol or the fourth symbol. For example, an index may be 2 or 3.

It should be understood that the foregoing predefined correspondences are merely examples. In actual implementation, a correspondence between a demodulation reference signal RE overhead value and at least one type of the following information may be predefined: the DCI format, the configuration type of the demodulation reference signal, the quantity of symbols occupied by the demodulation reference signal, the waveform, the RNTI scrambling manner of the DCI, the quantity of symbols occupied by the data block, and the position of the symbol occupied by the data block. For a specific predefinition manner, refer to the foregoing manners. Details are not described herein again.

After the demodulation reference signal RE overhead value is predefined for the first information in any one of the foregoing manners, the base station 110 and the UE 120 may configure a correspondence, predefined in this manner, between the first information and the demodulation reference signal RE overhead value. The correspondence configured on the UE 120 may be directly configured, or may be configured by the UE 120 after the UE 120 receives the correspondence from the base station 110.

The base station 110 and the UE 120 configure the correspondence, predefined in any one of the foregoing manners, between the first information and the demodulation reference signal RE overhead value, and after obtaining the first information, the base station no and the UE 120 may obtain, based on the first information and the correspondence, the demodulation reference signal RE overhead value, so as to determine a TBS based on the RE overhead value.

Figure 6:
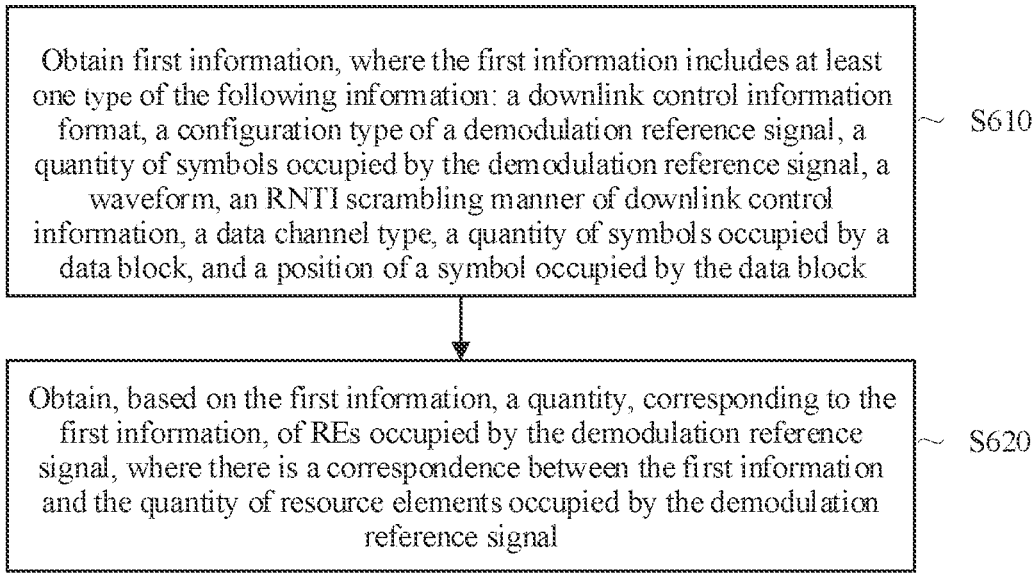
FIG. 6 is a schematic flowchart of a communication method according to an embodiment of this application.

FIG. 6 is a schematic flowchart of a method for determining a demodulation reference signal RE overhead value according to an embodiment of this application. It should be understood that FIG. 6 shows steps or operations of the communication method, but these steps or operations are merely examples. In this embodiment of this application, other operations or variations of the operations in FIG. 6 may be further performed. In addition, the steps in FIG. 6 may be performed in a sequence different from that shown in FIG. 6, and it may be unnecessary to perform all of the operations in FIG. 6.

The method shown in FIG. 6 is performed by a communications apparatus in a communication process. For example, the communications apparatus may be a base station 110, or may be UE 120.

S610. Obtain first information, where the first information includes at least one type of the following information: a downlink control information format, a configuration type of a demodulation reference signal, a quantity of symbols occupied by the demodulation reference signal, a waveform, an RNTI scrambling manner of downlink control information, a type of a data channel, a quantity of symbols occupied by a data block, and a position of a symbol occupied by the data block.

Optionally, at least one of the downlink control information format, the configuration type of the demodulation reference signal, the quantity of symbols occupied by the demodulation reference signal, the waveform, the RNTI scrambling manner of the downlink control information, the type of the data channel, the quantity of symbols occupied by the data block, and the position of the symbol occupied by the data block may be obtained by the communications apparatus (for example, the base station or the UE) based on a communication requirement; and/or may be obtained, according to an indication from a communications apparatus serving as a transmit end, by a communications apparatus serving as a receive end.

Optionally, the base station may inform the terminal of the first information via signaling. The terminal determines the first information based on the signaling of the base station. The signaling may be higher layer signaling, or may be physical layer signaling. Details are not limited in this application.

Optionally, the terminal or the base station may obtain the first information based on a requirement or pre-stored information of the terminal or the base station. Details are not limited in this application.

Optionally, "obtaining" in this application may be referred to as determining, obtaining, gaining, confirming, acquiring, or the like.

For example, the base station 110 may notify the UE 120 of the configuration type of the demodulation reference signal via higher layer signaling.

For example, the UE 120 may perform blind detection on the demodulation reference signal by using various RNTIs, and an RNTI scrambling manner corresponding to successful demodulation is an RNTI scrambling manner that needs to be obtained.

For example, the base station and/or the terminal may obtain the first information based on a characteristic of a data channel for data sending and/or a characteristic of a data channel for data receiving.

S620. Obtain, based on the first information, a quantity, corresponding to the first information, of REs occupied by the demodulation reference signal, where there is a correspondence between the first information and the quantity of resource elements occupied by the demodulation reference signal.

Optionally, the first information is in a one-to-one correspondence with the quantity of resource elements occupied by the demodulation reference signal.

Optionally, the quantity, corresponding to the first information, of resource elements occupied by the demodulation reference signal may include a quantity of resource elements occupied by a reference signal used for channel estimation and/or demodulation performed when a data block corresponding to the first information is received or sent.

Optionally, "obtaining" in this application may be referred to as determining, obtaining, gaining, confirming, acquiring, or the like.

It should be understood that the quantity of REs occupied by the demodulation reference signal herein may be a quantity of possible REs, used to transmit the demodulation reference signal, in a resource scheduled by the DCI. In other words, in this embodiment of this application, the quantity of REs occupied by the demodulation reference signal may be greater than or equal to a quantity of REs, actually used to transmit the demodulation reference signal, in the resource scheduled by using the DCI.

For example, if the first information includes the DCI format or the RNTI scrambling manner of the DCI, the quantity, corresponding to the first information, of resource elements occupied by the demodulation reference signal may include a quantity of resource elements occupied by a demodulation reference signal used for channel estimation and/or demodulation performed when a data block scheduled by the DCI is received; or if the first information includes a quantity of symbols occupied by the data block or a position of the symbol occupied by the data block, the quantity, corresponding to the first information, of resource elements occupied by the demodulation reference signal may include a quantity of resource elements occupied by a demodulation reference signal used for channel estimation and/or demodulation performed when the data block is received.

For example, when the first information includes the downlink control information format, and the base station no or the UE 120 configures a correspondence between the downlink control information format and a DMRS RE overhead in the foregoing design manner, the obtaining, by the base station 110 or the UE 120 based on the first information, a quantity of REs occupied by the DMRS may include: when the downlink control information format is DCI format 1_0, obtaining that the quantity of REs occupied by the DMRS is 4, or when the downlink control information format is DCI format 0_0, obtaining that the quantity of REs occupied by the DMRS is 6.

For example, when the first information includes the configuration type of the DMRS, and the base station 110 or the UE 120 configures a correspondence between the configuration type of the DMRS and a DMRS RE overhead value in the foregoing design manner, the obtaining, based on the first information, a quantity of REs occupied by the DMRS may include: when the configuration type of the DMRS is DMRS configuration type 1, obtaining that the quantity of REs occupied by the DMRS is 6; or when the configuration type of the DMRS is DMRS configuration type 2, obtaining that the quantity of REs occupied by the DMRS is 4.

For example, when the first information includes the configuration type of the DMRS and the quantity of symbols occupied by the DMRS, and the base station 110 or the UE 120 configures a correspondence between the configuration type of the DMRS and the quantity of symbols occupied by the DMRS, and a DMRS RE overhead in the foregoing design manner, the obtaining, based on the first information, a quantity of REs occupied by the DMRS includes: when the configuration type of the DMRS is DMRS configuration type 1, and the quantity of symbols occupied by the DMRS is 1, obtaining that the quantity of REs occupied by the DMRS is 6; or when the configuration type of the DMRS is DMRS configuration type 1, and the quantity of symbols occupied by the DMRS is 2, obtaining that the quantity of REs occupied by the DMRS is 12; or when the configuration type of the DMRS is DMRS configuration type 2, and the quantity of symbols occupied by the DMRS is 1, obtaining that the quantity of REs occupied by the DMRS is 4; or when the configuration type of the DMRS is DMRS configuration type 2, and the quantity of symbols occupied by the DMRS is 2, obtaining that the quantity of REs occupied by the DMRS is 8.

It should be understood that when the base station no and the UE 120 configure, in any one of the foregoing manners, a correspondence between the first information and a DMRS RE overhead value, methods used by the base station no and the UE 120 to obtain the DMRS RE overhead value are similar to those in the foregoing examples. Details are not described herein again.

According to the method provided in this application, the UE 120 can obtain the DMRS RE overhead value without receiving information sent by the base station no for indicating a CDM group, and can further determine a TBS based on the RE overhead value.

For example, when receiving fallback DCI from the base station no, the UE 120 can also obtain the DMRS RE overhead value and determine a TBS, thereby improving transmission performance.

In another embodiment of this application, the base station no may notify, by using signaling, the UE 120 of the DMRS RE overhead value. The signaling may be higher layer signaling, physical layer signaling, or the like.

For example, the base station no sends signaling to the UE 120, and the signaling is used to indicate that the DMRS RE overhead value is one of 4, 6, 8, 12, 24, and the like.

In another embodiment of this application, the base station no may configure, for the UE 120 via higher layer signaling, a plurality of DMRS RE overhead values, and then the base station 110 notifies, via signaling, the UE 120 of a specific value in the plurality of DMRS RE overhead values, so that the UE 120 can determine a TBS.

Figure 7:
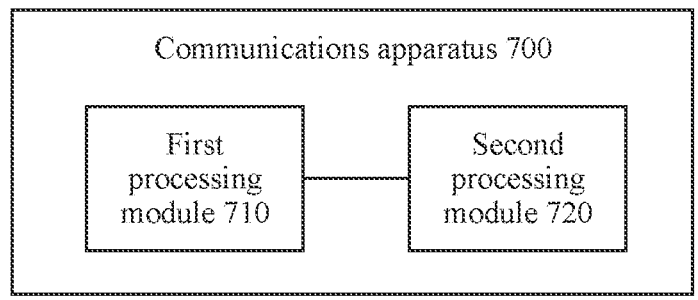
FIG. 7 is a schematic structural diagram of a communications apparatus according to an embodiment of this application.

FIG. 7 is a schematic structural diagram of a communications apparatus according to an embodiment of this application. It should be understood that the communications apparatus 700 shown in FIG. 7 is merely an example. The communications apparatus in this embodiment of this application may further include other modules or units, or include modules having functions similar to those of modules in FIG. 7, or does not necessarily need to include all modules in FIG. 7.

The communications apparatus 700 may include a first processing module 710 and a second processing module 720. The communications apparatus 700 may be configured to perform the method shown in FIG. 6.

For example, the first processing module 710 is configured to obtain first information, where the first information includes at least one type of the following information: a downlink control information format, a configuration type of a demodulation reference signal, a quantity of symbols occupied by the demodulation reference signal, a waveform, a radio network temporary identifier scrambling manner of downlink control information, a type of a data channel, a quantity of symbols occupied by a data block, and a position of a symbol occupied by the data block.

The second processing module 720 is configured to obtain, based on the first information, a quantity, corresponding to the first information, of resource elements occupied by the demodulation reference signal, where there is a correspondence between the first information and the quantity of resource elements occupied by the demodulation reference signal.

Optionally, the first information is in a one-to-one correspondence with the quantity of resource elements occupied by the demodulation reference signal.

Optionally, when the first information includes the downlink control information format, the second processing module 720 is specifically configured to:

if the downlink control information format is downlink control information format 1_0, obtain that the quantity of resource elements occupied by the demodulation reference signal is 4 or 6; and/or if the downlink control information format is downlink control information format 0_0, obtain that the quantity of resource elements occupied by the demodulation reference signal is 6 or 4.

Optionally, when the first information includes the configuration type of the demodulation reference signal, the second processing module 720 is specifically configured to:

if the configuration type of the demodulation reference signal is configuration type 1, obtain that the quantity of resource elements occupied by the demodulation reference signal is 6; and/or if the configuration type of the demodulation reference signal is configuration type 2, obtain that the quantity of resource elements occupied by the demodulation reference signal is 4.

Optionally, when the first information includes the configuration type of the demodulation reference signal and the quantity of symbols occupied by the demodulation reference signal, the second processing module 720 is specifically configured to:

if the configuration type of the demodulation reference signal is configuration type 1, and the quantity of symbols occupied by the demodulation reference signal is 1, obtain that the quantity of resource elements occupied by the demodulation reference signal is 6; and/or if the configuration type of the demodulation reference signal is configuration type 1, and the quantity of symbols occupied by the demodulation reference signal is 2, obtain that the quantity of resource elements occupied by the demodulation reference signal is 12; and/or if the configuration type of the demodulation reference signal is configuration type 2, and the quantity of symbols occupied by the demodulation reference signal is 1, obtain that the quantity of resource elements occupied by the demodulation reference signal is 4; and/or if the configuration type of the demodulation reference signal is configuration type 2, and the quantity of symbols occupied by the demodulation reference signal is 2, obtain that the quantity of resource elements occupied by the demodulation reference signal is 8.

Optionally, the second processing module 720 is specifically configured to obtain the quantity of resource elements occupied by the demodulation reference signal, based on the correspondence between the first information and the quantity of resource elements occupied by the demodulation reference signal.

Figure 8:
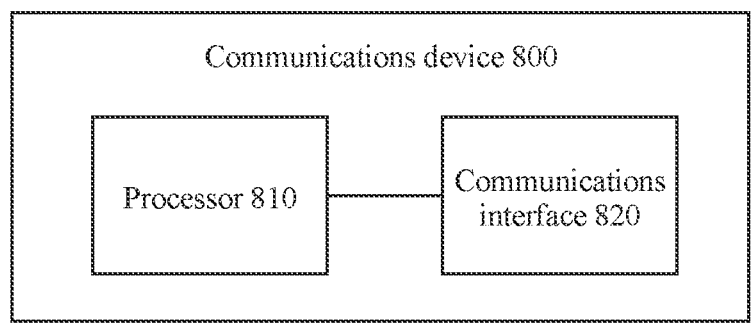
FIG. 8 is a schematic structural diagram of a communications device according to an embodiment of this application.

FIG. 8 is a schematic structural diagram of a communications device according to an embodiment of this application. It should be understood that the communications device 800 shown in FIG. 8 is merely an example. The communications device in this embodiment of this application may further include other modules or units, or include modules having functions similar to those of modules in FIG. 8, or does not necessarily need to include all modules in FIG. 8.

The communications device 800 includes at least one processor 810 and a communications interface 820. The communications device 800 may be configured to perform the method shown in FIG. 6.

For example, the communications interface is configured to exchange information with another communications device, and the at least one processor 810 executes one or more instructions, so that the communications device 800 performs the method shown in FIG. 6.

Optionally, the communications device 800 may be an access network device or a terminal device. When the communications device 800 is a terminal device, the correspondence may be configured by the terminal device according to a communication protocol, or may be received by the terminal device from an access network device.

Figure 9:
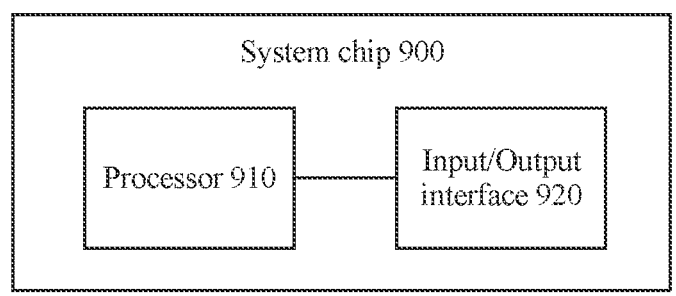
FIG. 9 is a schematic structural diagram of a system chip according to an embodiment of this application.

FIG. 9 is a schematic structural diagram of a system chip according to an embodiment of this application. It should be understood that the system chip 900 shown in FIG. 9 is merely an example. The system chip in this embodiment of this application may further include other modules or units, or include modules having functions similar to those of modules in FIG. 9, or does not necessarily need to include all modules in FIG. 9.

The system chip 900 includes at least one processor 910 and an input/output interface 920. The system chip 900 may be configured to perform the method shown in FIG. 6.

For example, the input/output interface is configured to exchange information with another communications device, and the at least one processor 910 executes one or more instructions, so that the system chip 900 performs the method shown in FIG. 6.

Figure 10:
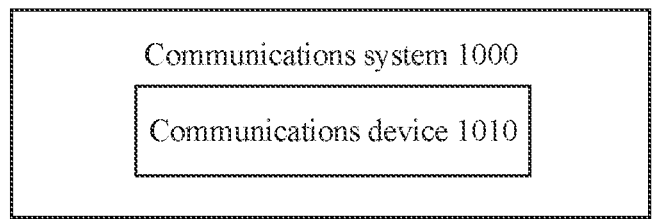
FIG. 10 is a schematic structural diagram of a communications system according to an embodiment of this application.

FIG. 10 is a schematic structural diagram of a communications system according to an embodiment of this application. It should be understood that the communications system woo shown in FIG. 10 is merely an example. The communications system in this embodiment of this application may further include other modules or units, or include modules having functions similar to those of modules in FIG. 10, or does not necessarily need to include all modules in FIG. 10.

The communications system woo includes a communications device 1010. The communications device 1010 may be the communications device 800 shown in FIG. 8.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for all particular applications, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments. Details are not described herein again.

This application further provides the following embodiments. It should be noted that the following embodiments are numbered in a way different from a manner in which the foregoing embodiments in this application are numbered.

Embodiment 1: A method for obtaining a quantity of resource elements in a communication process is provided, and the method includes:

obtaining first information, where the first information includes at least one type of the following information: a downlink control information format, a configuration type of a demodulation reference signal, a quantity of symbols occupied by the demodulation reference signal, a waveform, a radio network temporary identifier scrambling manner of downlink control information, a type of a data channel, a quantity of symbols occupied by a data block, and a position of a symbol occupied by the data block; and obtaining, based on the first information, a quantity, corresponding to the first information, of resource elements occupied by the demodulation reference signal, where there is a correspondence between the first information and the quantity of resource elements occupied by the demodulation reference signal.

Embodiment 2: According to the method in Embodiment 1, the first information is in a one-to-one correspondence with the quantity of resource elements occupied by the demodulation reference signal.

Embodiment 3: According to the method in Embodiment 1 or 2, when the first information includes the downlink control information format, the obtaining, based on the first information, a quantity of resource elements occupied by the demodulation reference signal includes:

if the downlink control information format is downlink control information format 1_0, obtaining that the quantity of resource elements occupied by the demodulation reference signal is 4 or 6; and/or if the downlink control information format is downlink control information format 0_0, obtaining that the quantity of resource elements occupied by the demodulation reference signal is 6 or 4.

Embodiment 4: According to the method in Embodiment 1 or 2, when the first information includes the configuration type of the demodulation reference signal, the obtaining, based on the first information, a quantity of resource elements occupied by the demodulation reference signal includes:

if the configuration type of the demodulation reference signal is configuration type 1, obtaining that the quantity of resource elements occupied by the demodulation reference signal is 6; and/or if the configuration type of the demodulation reference signal is configuration type 2, obtaining that the quantity of resource elements occupied by the demodulation reference signal is 4.

Embodiment 5: According to the method in Embodiment 1 or 2, the first information includes the configuration type of the demodulation reference signal and the quantity of symbols occupied by the demodulation reference signal, the obtaining, based on the first information, a quantity of resource elements occupied by the demodulation reference signal includes: if the configuration type of the demodulation reference signal is configuration type 1, and the quantity of symbols occupied by the demodulation reference signal is 1, obtaining that the quantity of resource elements occupied by the demodulation reference signal is 6; and/or if the configuration type of the demodulation reference signal is configuration type 1, and the quantity of symbols occupied by the demodulation reference signal is 2, obtaining that the quantity of resource elements occupied by the demodulation reference signal is 12; and/or if the configuration type of the demodulation reference signal is configuration type 2, and the quantity of symbols occupied by the demodulation reference signal is 1, obtaining that the quantity of resource elements occupied by the demodulation reference signal is 4; and/or if the configuration type of the demodulation reference signal is a configuration type 2, and the quantity of symbols occupied by the demodulation reference signal is 2, obtaining that the quantity of resource elements occupied by the demodulation reference signal is 8.

Embodiment 6: According to the method in any one of Embodiment 1 to Embodiment 5, the obtaining, based on the first information, a quantity of resource elements occupied by the demodulation reference signal includes: obtaining the quantity of resource elements occupied by the demodulation reference signal, based on the correspondence between the first information and the quantity of resource elements occupied by the demodulation reference signal.

Embodiment 7: According to the method in Embodiment 6, the method is performed by a terminal device, and the correspondence is configured by the terminal device according to a communication protocol or received by the terminal device from an access network device.

Embodiment 8: A communications apparatus is provided and includes: a first processing module, configured to obtain first information, where the first information includes at least one type of the following information: a downlink control information format, a configuration type of a demodulation reference signal, a quantity of symbols occupied by the demodulation reference signal, a waveform, a radio network temporary identifier scrambling manner of downlink control information, a type of a data channel, a quantity of symbols occupied by a data block, and a position of a symbol occupied by the data block; and a second processing module, configured to obtain, based on the first information, a quantity, corresponding to the first information, of resource elements occupied by the demodulation reference signal, where there is a correspondence between the first information and the quantity of resource elements occupied by the demodulation reference signal.

Embodiment 9: According to the communications apparatus in Embodiment 8, the first information is in a one-to-one correspondence with the quantity of resource elements occupied by the demodulation reference signal.

Embodiment 10: According to the communications apparatus in Embodiment 8 or 9, when the first information includes the downlink control information format, the second processing module is specifically configured to: if the downlink control information format is downlink control information format 1_0, obtain that the quantity of resource elements occupied by the demodulation reference signal is 4 or 6; and/or if the downlink control information format is downlink control information format 0_0, obtain that the quantity of resource elements occupied by the demodulation reference signal is 6 or 4.

Embodiment 11: According to the communications apparatus in Embodiment 8 or 9, when the first information includes the configuration type of the demodulation reference signal, the second processing module is specifically configured to: if the configuration type of the demodulation reference signal is configuration type 1, obtain that the quantity of resource elements occupied by the demodulation reference signal is 6; and/or if the configuration type of the demodulation reference signal is configuration type 2, obtain that the quantity of resource elements occupied by the demodulation reference signal is 4.

Embodiment 12: According to the communications apparatus in Embodiment 8 or 9, when the first information includes the configuration type of the demodulation reference signal and the quantity of symbols occupied by the demodulation reference signal, the second processing module is specifically configured to: if the configuration type of the demodulation reference signal is configuration type 1, and the quantity of symbols occupied by the demodulation reference signal is 1, obtain that the quantity of resource elements occupied by the demodulation reference signal is 6; and/or if the configuration type of the demodulation reference signal is configuration type 1, and the quantity of symbols occupied by the demodulation reference signal is 2, obtain that the quantity of resource elements occupied by the demodulation reference signal is 12; and/or if the configuration type of the demodulation reference signal is configuration type 2, and the quantity of symbols occupied by the demodulation reference signal is 1, obtain that the quantity of resource elements occupied by the demodulation reference signal is 4; and/or if the configuration type of the demodulation reference signal is configuration type 2, and the quantity of symbols occupied by the demodulation reference signal is 2, obtain that the quantity of resource elements occupied by the demodulation reference signal is 8.

Embodiment 13: According to the communications apparatus in any one of embodiments 8 to 12, the second processing module is specifically configured to obtain the quantity of resource elements occupied by the demodulation reference signal, based on the first information and the correspondence between the first information and the quantity of resource elements occupied by the demodulation reference signal.

Embodiment 14: According to the communications apparatus in Embodiment 13, the communications apparatus is a terminal device, and the correspondence is configured by the terminal device according to a communication protocol or received by the terminal device from an access network device.

Embodiment 15: A communications device is provided, and the communications device includes at least one processor and a communications interface. The communications interface is used by the communications device to exchange information with another communications device, and when one or more instructions is executed by the at least one processor, the communications device performs the method in any one of Embodiments 1 to 7.

Embodiment 16: A computer program storage medium is provided. The computer program storage medium has one or more instructions, and when the program instruction is directly or indirectly executed, functions of either of the following devices in the method in any one of Embodiments 1 to 7 are performed: the terminal device and the access network device.

Embodiment 17: A chip system is provided. The chip system includes at least one processor, and when one or more instructions is executed by the at least one processor, functions of either of the following devices in the method in any one of Embodiments 1 to 7 are performed: the terminal device and the access network device.

Embodiment 18: A communications system is provided, and the communications system includes the communications device in Embodiment 15.

In the several embodiments provided in this application, it should be understood that the disclosed system, apparatus, and method may be implemented in other manners. For example, the described apparatus embodiments are merely examples. For example, the unit division is merely logical function division and there may be another division manner during actual implementation. For example, a plurality of units or components may be combined or integrated into another system, or some features may be ignored or may not be performed. In addition, the displayed or discussed mutual couplings or direct couplings or communication connections may be implemented via some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position, or may be distributed onto a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   transmitting a downlink control information (DCI) that schedules a data transmission, wherein a DCI format 0f the DCI is DCI format 0_0 or DCI format 1_0; and
   determining a quantity of resource elements per physical resource block (PRB) for a demodulation reference signal (DMRS), based on the DCI format of the DCI, to determine a transport block size (TBS) of the data transmission.

2. The wireless communication method according to claim 1, wherein the quantity of resource elements per PRB for the DMRS is 6, 12, or 24.

3. The wireless communication method according to claim 1, wherein a configuration type of the DMRS is DMRS configuration type 1, a quantity of symbols occupied by the DMRS is 1, and the quantity of resource elements per PRB for the DMRS is 6, 12, or 24.

4. The wireless communication method according to claim 1, wherein:
   a configuration type of the DMRS is DMRS configuration type 1, a quantity of symbols occupied by the DMRS is 1, a quantity of symbols occupied by a transport block of the data transmission is greater than or equal to 7, and the quantity of resource elements per PRB for the DMRS is 12, 24, or 36; or
   a configuration type of the DMRS is DMRS configuration type 1, a quantity of symbols occupied by the DMRS is 1, a quantity of symbols occupied by the transport block is less than 7, and the quantity of resource elements per PRB for the DMRS is 6, 12, or 24.

5. The wireless communication method according to claim 1, wherein: a configuration type of the DMRS is DMRS configuration type 1, a quantity of symbols occupied by the DMRS is 1, a quantity of symbols occupied by a transport block of the data transmission is greater than or equal to 7, the quantity of resource elements per PRB for the DMRS is 12, 24, or 36, and a last symbol occupied by the transport block is on or after a ninth symbol in a time unit used for transmission of the transport block, or an index of the last symbol occupied by the transport block is greater than or equal to 8; or
   a configuration type of the DMRS is DMRS configuration type 1, a quantity of symbols occupied by the DMRS is 1, a quantity of symbols occupied by the transport block is less than 7, the quantity of resource elements per PRB for the DMRS is 6, 12, or 24, and the last symbol occupied by the transport block is before the ninth symbol in the time unit used for transmission of the transport block, or the index of the last symbol occupied by the transport block is less than 8.

6. The wireless communication method according to claim 1, wherein a configuration type of the DMRS is DMRS configuration type 1, a quantity of symbols occupied by the DMRS is 1, a quantity of symbols occupied by a transport block of the data transmission is less than 7, or the quantity of symbols occupied by the transport block is greater than or equal to 7, and a quantity of additional DMRSs is 0, 1, or 2.

7. The wireless communication method according to claim 1, wherein a configuration type of the DMRS is DMRS configuration type 1, a quantity of symbols occupied by the DMRS is 1, a quantity of symbols occupied by a transport block of the data transmission is less than 7, or the quantity of symbols occupied by the transport block is greater than or equal to 7, and a quantity of additional DMRSs is 0, 1, or 2; and
   wherein a last symbol occupied by the transport block is on or after a ninth symbol in a time unit used for transmission of the transport block, or an index of the last symbol occupied by the transport block is greater than or equal to 8, or
   the last symbol occupied by the transport block is before the ninth symbol in the time unit used for transmission of the transport block, or the index of the last symbol occupied by the transport block is less than 8.

8. A wireless communication apparatus, comprising:
   an interface circuit, configured to:
      transmit a downlink control information (DCI), wherein a DCI format of the DCI is DCI format 0_0 or DCI format 1_0, and the DCI schedules a data transmission; and
   at least one processor, configured to:
      determine a quantity of resource elements per physical resource block (PRB) for a demodulation reference signal (DMRS), based on the DCI format of the DCI, to determine a transport block size (TBS) of the data transmission.

9. The wireless communication apparatus according to claim 8, wherein the quantity of resource elements per PRB for the DMRS is 6, 12, or 24.

10. The wireless communication apparatus according to claim 8, wherein a configuration type of the DMRS is DMRS configuration type 1, a quantity of symbols occupied by the DMRS is 1, and the quantity of resource elements per PRB for the DMRS is 6, 12, or 24.

11. The wireless communication apparatus according to claim 8, wherein:
   a configuration type of the DMRS is DMRS configuration type 1, a quantity of symbols occupied by the DMRS is 1, a quantity of symbols occupied by a transport block of the data transmission is greater than or equal to 7, and the quantity of resource elements per PRB for the DMRS is 12, 24, or 36; or
   a configuration type of the DMRS is DMRS configuration type 1, a quantity of symbols occupied by the DMRS is 1, a quantity of symbols occupied by the transport block is less than 7, and the quantity of resource elements per PRB for the DMRS is 6, 12, or 24.

12. The wireless communication apparatus according to claim 8, wherein:
   a configuration type of the DMRS is DMRS configuration type 1, a quantity of symbols occupied by the DMRS is 1, a quantity of symbols occupied by a transport block of the data transmission is greater than or equal to 7, the quantity of resource elements per PRB for the DMRS is 12, 24, or 36, and a last symbol occupied by the transport block is on or after a ninth symbol in a time unit used for transmission of the transport block, or an index of the last symbol occupied by the transport block is greater than or equal to 8; or a configuration type of the DMRS is DMRS configuration type 1, a quantity of symbols occupied by the DMRS is 1, a quantity of symbols occupied by the transport block is less than 7, the quantity of resource elements per PRB for the DMRS is 6, 12, or 24, and the last symbol occupied by the transport block is before the ninth symbol in the time unit used for transmission of the transport block, or the index of the last symbol occupied by the transport block is less than 8.

13. The wireless communication apparatus according to claim 8, wherein a configuration type of the DMRS is DMRS configuration type 1, a quantity of symbols occupied by the DMRS is 1, a quantity of symbols occupied by a transport block of the data transmission is less than 7, or the quantity of symbols occupied by the transport block is greater than or equal to 7, and a quantity of additional DMRSs is 0, 1, or 2.

14. The wireless communication apparatus according to claim 8, wherein a configuration type of the DMRS is DMRS configuration type 1, a quantity of symbols occupied by the DMRS is 1, a quantity of symbols occupied by a transport block of the data transmission is less than 7, or the quantity of symbols occupied by the transport block is greater than or equal to 7, and a quantity of additional DMRSs is 0, 1, or 2; and wherein a last symbol occupied by the transport block is on or after a ninth symbol in a time unit used for transmission of the transport block, or an index of the last symbol occupied by the transport block is greater than or equal to 8, or the last symbol occupied by the transport block is before the ninth symbol in the time unit used for transmission of the transport block, or the index of the last symbol occupied by the transport block is less than 8.

15. A wireless communication apparatus, comprising:
an interface circuit, configured to:
receive a downlink control information (DCI), wherein a DCI format of the DCI is DCI format 0_0 or DCI format 1_0, and the DCI schedules a data transmission; and
at least one processor, configured to:
determine a quantity of resource elements per physical resource block (PRB) for a demodulation reference signal (DMRS), based on the DCI format of the DCI, to determine a transport block size (TBS) of the data transmission.

16. The wireless communication apparatus according to claim 15, wherein the quantity of resource elements per PRB for the DMRS is 6, 12, or 24.

17. The wireless communication apparatus according to claim 15, wherein a configuration type of the DMRS is DMRS configuration type 1, a quantity of symbols occupied by the DMRS is 1, and the quantity of resource elements per PRB for the DMRS is 6, 12, or 24.

18. The wireless communication apparatus according to claim 15, wherein:
a configuration type of the DMRS is DMRS configuration type 1, a quantity of symbols occupied by the DMRS is 1, a quantity of symbols occupied by a transport block of the data transmission is greater than or equal to 7, and the quantity of resource elements per PRB for the DMRS is 12, 24, or 36; or
a configuration type of the DMRS is DMRS configuration type 1, a quantity of symbols occupied by the DMRS is 1, a quantity of symbols occupied by the transport block is less than 7, and the quantity of resource elements per PRB for the DMRS is 6, 12, or 24.

19. The wireless communication apparatus according to claim 15, wherein:
a configuration type of the DMRS is DMRS configuration type 1, a quantity of symbols occupied by the DMRS is 1, a quantity of symbols occupied by a transport block of the data transmission is greater than or equal to 7, the quantity of resource elements per PRB for the DMRS is 12, 24, or 36, and a last symbol occupied by the transport block is on or after a ninth symbol in a time unit used for transmission of the transport block, or an index of the last symbol occupied by the transport block is greater than or equal to 8; or
a configuration type of the DMRS is DMRS configuration type 1, a quantity of symbols occupied by the DMRS is 1, a quantity of symbols occupied by the transport block is less than 7, the quantity of resource elements per PRB for the DMRS is 6, 12, or 24, and the last symbol occupied by the transport block is before the ninth symbol in the time unit used for transmission of the transport block, or the index of the last symbol occupied by the transport block is less than 8.

20. The wireless communication apparatus according to claim 15, wherein a configuration type of the DMRS is DMRS configuration type 1, a quantity of symbols occupied by the DMRS is 1, a quantity of symbols occupied by a transport block of the data transmission is less than 7, or the quantity of symbols occupied by the transport block is greater than or equal to 7, and a quantity of additional DMRSs is 0, 1, or 2.

* * * * *

UNITED STATES PATENT AND TRADEMARK OFFICE
CERTIFICATE OF CORRECTION

| | | |
|---|---|---|
| PATENT NO. | : 11,962,526 B2 | Page 1 of 3 |
| APPLICATION NO. | : 17/180387 | |
| DATED | : April 16, 2024 | |
| INVENTOR(S) | : Wang et al. | |

It is certified that error appears in the above-identified patent and that said Letters Patent is hereby corrected as shown below:

On the Title Page

Item (63), in Column 1, under "Related U.S. Application Data", Line 3, below "(Continued)" insert
-- (30) Foreign Application Priority Data
Feb. 13, 2018 (CN) .......................... 201810150365.0 --.

In the Specification

In Column 4, Line 50, delete "no" and insert -- 110 --.

In Column 4, Line 52, delete "no" and insert -- 110 --.

In Column 5, Line 32, delete "no" and insert -- 110 --.

In Column 6, Line 13, delete "11o." and insert -- 110. --.

In Column 6, Line 18, delete "11o," and insert -- 110, --.

In Column 6, Line 23, delete "no" and insert -- 110 --.

In Column 7, Line 6, delete "no" and insert -- 110 --.

In Column 7, Line 8, delete "no" and insert -- 110 --.

In Column 7, Line 49, delete "no," and insert -- 110, --.

In Column 8, Line 57, delete "no" and insert -- 110 --.

In Column 9, Line 33, delete "0f" and insert -- of --.

Signed and Sealed this
Twenty-first Day of May, 2024

*Katherine Kelly Vidal*
Katherine Kelly Vidal
*Director of the United States Patent and Trademark Office*

CERTIFICATE OF CORRECTION (continued)
U.S. Pat. No. 11,962,526 B2

In Column 9, Line 35, delete "0f" and insert -- of --.

In Column 9, Line 37, delete "0f" and insert -- of --.

In Column 9, Line 39, delete "0f" and insert -- of --.

In Column 9, Line 40, delete "0f" and insert -- of --.

In Column 9, Line 43, delete "0f" and insert -- of --.

In Column 9, Line 44, delete "0f" and insert -- of --.

In Column 9, Line 47, delete "0f" and insert -- of --.

In Column 9, Line 49, delete "0f" and insert -- of --.

In Column 9, Line 50, delete "0f" and insert -- of --.

In Column 9, Line 53, delete "0f" and insert -- of --.

In Column 9, Line 54, delete "0f" and insert -- of --.

In Column 9, Line 65, delete "0f" and insert -- of --.

In Column 9, Line 66, delete "0f" and insert -- of --.

In Column 10, Line 11, delete "0f" and insert -- of --.

In Column 10, Line 13, delete "0f" and insert -- of --.

In Column 10, Line 15, delete "0f" and insert -- of --.

In Column 10, Line 17, delete "0f" and insert -- of --.

In Column 10, Line 58, delete ""n"" and insert -- "11" --.

In Column 12, Line 21, delete "poll" and insert -- port --.

In Column 16, Line 65, delete ""ii"" and insert -- "11" --.

In Column 17, Line 52, delete ""le" and insert -- "11" --.

In Column 18, Line 12, delete ""n"" and insert -- "11" --.

In Column 19, Line 30, delete ""n"" and insert -- "11" --.

CERTIFICATE OF CORRECTION (continued)
U.S. Pat. No. 11,962,526 B2

In Column 22, Line 63, after "where" delete "Win" and insert -- W10 --.

In Column 22, Line 63, after "of" delete "Win" and insert -- W10 --.

In Column 22, Line 64, delete "Win" and insert -- W10 --.

In Column 22, Line 66, delete "Win" and insert -- W10 --.

In Column 27, Line 25, delete "cis" and insert -- is --.

In Column 31, Line 57, delete "no" and insert -- 110 --.

In Column 32, Line 31, delete "no" and insert -- 110 --.

In Column 34, Line 8, delete "no" and insert -- 110 --.

In Column 34, Line 56, delete "no" and insert -- 110 --.

In Column 34, Line 59, delete "no" and insert -- 110 --.

In Column 34, Line 65, delete "no" and insert -- 110 --.

In Column 35, Line 2, delete "no," and insert -- 110, --.

In Column 35, Line 6, delete "no" and insert -- 110 --.

In Column 35, Line 9, delete "no" and insert -- 110 --.

In Column 35, Line 13, delete "no" and insert -- 110 --.

In Column 37, Line 16, delete "woo" and insert -- 1000 --.

In Column 37, Line 22, delete "woo" and insert -- 1000 --.

In the Claims

In Column 41, in Claim 1, Line 22, delete "0f" and insert -- of --.